United States Patent
Kim et al.

(10) Patent No.: US 11,900,929 B2
(45) Date of Patent: Feb. 13, 2024

(54) ELECTRONIC APPARATUS PROVIDING VOICE-BASED INTERFACE AND METHOD FOR CONTROLLING THE SAME

(71) Applicant: Samsung Electronics Co., Ltd., Gyeonggi-do (KR)

(72) Inventors: Yongho Kim, Gyeonggi-do (KR); Hyunjin Kim, Gyeonggi-do (KR); Sunah Kim, Gyeonggi-do (KR); Dayoung Lee, Gyeonggi-do (KR); Jaeyoung Lee, Gyeonggi-do (KR); Jungkun Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 142 days.

(21) Appl. No.: 17/108,112

(22) Filed: Dec. 1, 2020

(65) Prior Publication Data
US 2021/0166689 A1 Jun. 3, 2021

(30) Foreign Application Priority Data
Dec. 2, 2019 (KR) .................. 10-2019-0158475

(51) Int. Cl.
  *G10L 15/22* (2006.01)
  *G10L 15/26* (2006.01)
  *G10L 17/00* (2013.01)
  *G06F 3/16* (2006.01)
  *H04R 1/00* (2006.01)
  (Continued)

(52) U.S. Cl.
CPC .............. *G10L 15/22* (2013.01); *G06F 3/167* (2013.01); *H04R 1/00* (2013.01); *H04R 1/028* (2013.01); *H04R 1/08* (2013.01); *G10L 2015/221* (2013.01); *G10L 2015/223* (2013.01); *H04R 2420/07* (2013.01)

(58) Field of Classification Search
CPC .......... G10L 15/22; G10L 15/26; G10L 17/00
USPC .................................... 704/246, 251
See application file for complete search history.

(56) References Cited

U.S. PATENT DOCUMENTS 8,856,948 B1    10/2014  Robison et al.
10,489,111 B2   11/2019  Jeong
(Continued)

FOREIGN PATENT DOCUMENTS

EP        3570141 A1      11/2019
KR   10-2018-0126946 A    11/2018
(Continued)

OTHER PUBLICATIONS

International Search Report dated Mar. 18, 2021.

Primary Examiner — George C Monikang
(74) Attorney, Agent, or Firm — Cha & Reiter, LLC

(57) ABSTRACT

According to an embodiment of the disclosure, an electronic device may include a speaker, a microphone, a wireless communication circuit, and at least one processor connected to the speaker, the microphone, and the wireless communication circuit. The at least one processor may be configured to: in response to a user's voice command received through the microphone, perform a task corresponding to the voice command, based on an information amount contained in a result of the task, determine a type of the result to be visually appropriate or auditorily appropriate, and based on the type of the result, determine a device for providing the result as a screen device or a speaker.

20 Claims, 26 Drawing Sheets

(51) Int. Cl.
   *H04R 1/02* (2006.01)
   *H04R 1/08* (2006.01)

(56) References Cited

U.S. PATENT DOCUMENTS

| | | |
|---|---|---|
| 2015/0106085 A1* | 4/2015 | Lindahl ................... G10L 15/32 |
| | | 704/231 |
| 2016/0259656 A1 | 9/2016 | Sumner et al. |
| 2018/0060030 A1 | 3/2018 | Wang et al. |
| 2019/0156016 A1 | 5/2019 | Fram |
| 2020/0090654 A1* | 3/2020 | Shin ........................ H04L 12/28 |
| 2020/0342869 A1 | 10/2020 | Lee et al. |

FOREIGN PATENT DOCUMENTS

| | | |
|---|---|---|
| KR | 10-1925034 B1 | 12/2018 |
| KR | 10-2019-0121558 A | 10/2019 |
| WO | 2019/078576 A1 | 4/2019 |

* cited by examiner

ELECTRONIC APPARATUS PROVIDING VOICE-BASED INTERFACE AND METHOD FOR CONTROLLING THE SAME

CROSS-REFERENCE TO RELATED APPLICATION(S)

This application is based on and claims priority under 35 U.S.C. § 119 to Korean Patent Application No. 10-2019-0158475, filed on Dec. 2, 2019, in the Korean Intellectual Property Office, the disclosure of which is incorporated by reference herein in its entirety.

TECHNICAL FIELD

One or more embodiments of the instant disclosure relate generally to an interaction between an electronic device and a user. More particularly, one or more embodiments of the instant disclosure generally relate to an electronic device for interacting with the user based on voice and a method for controlling the same.

BACKGROUND

A smart assistant device (e.g., a smart speaker) may interact with the user through a voice-based interface. The smart assistant device may receive and analyze the user's voice command and feedback the requested result back using voice output. If the electronic device and the user interact based on voice, the user may easily control the electronic device without using his/her hands.

As Internet of things (IoT) networks develop, users may control various electronic devices through a particular electronic device (e.g., the user's mobile device or a particular smart speaker). For example, the user may control a lamp, the television, a robot cleaner, a washing machine, and so on, through the smart speaker in his or her home. By controlling various electronic devices/home appliances through the smart speaker, a smart home system may be implemented.

SUMMARY

A conventional smart assistant device provides responses to the user's commands via voice input/output. If the voice carries too much information, efficiency of the information delivery may degrade. For example, if the smart assistant device provides, via voice output, a considerable amount of information at a single given time, it is hard for the user to recognize or remember all of the important information. There is a limit for how much information a person can auditorily recognize and remember.

An embodiment of the disclosure provides an electronic device or a method for effectively providing information corresponding to a voice command in response to the voice command of a user.

The technical problem to achieve in the document is not limited to the technical problem mentioned above, and other technical problems not mentioned above may be clearly understood by those skilled in the technical field to which the disclosure belongs from the following descriptions.

According to embodiments of the disclosure, an electronic device may include a speaker, a microphone, a wireless communication circuit, and at least one processor connected to the speaker, the microphone, and the wireless communication circuit, wherein the at least one processor may be configured to, in response to a user's voice command received through the microphone, perform a task corresponding to the voice command, based on an information amount contained in a result of the task, determine a type of the result to be visually appropriate or auditorily appropriate, and based on the type of the result, determine a device for providing the result as a screen device or a speaker.

In an embodiment, a storage medium is a non-transitory computer readable storage medium for storing one or more programs, wherein the one or more programs may include instructions, when executed by one or more processors of an electronic device, causing the electronic device to receive a user's voice command through a microphone of the electronic device, in response to the user's voice command, perform a task corresponding to the command, based on an information amount contained in a result of the task, determine a type of the result to be visually appropriate or auditorily appropriate, and based on the type of the result, determine a device for providing the result as a screen device or a speaker.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

Figure 1:
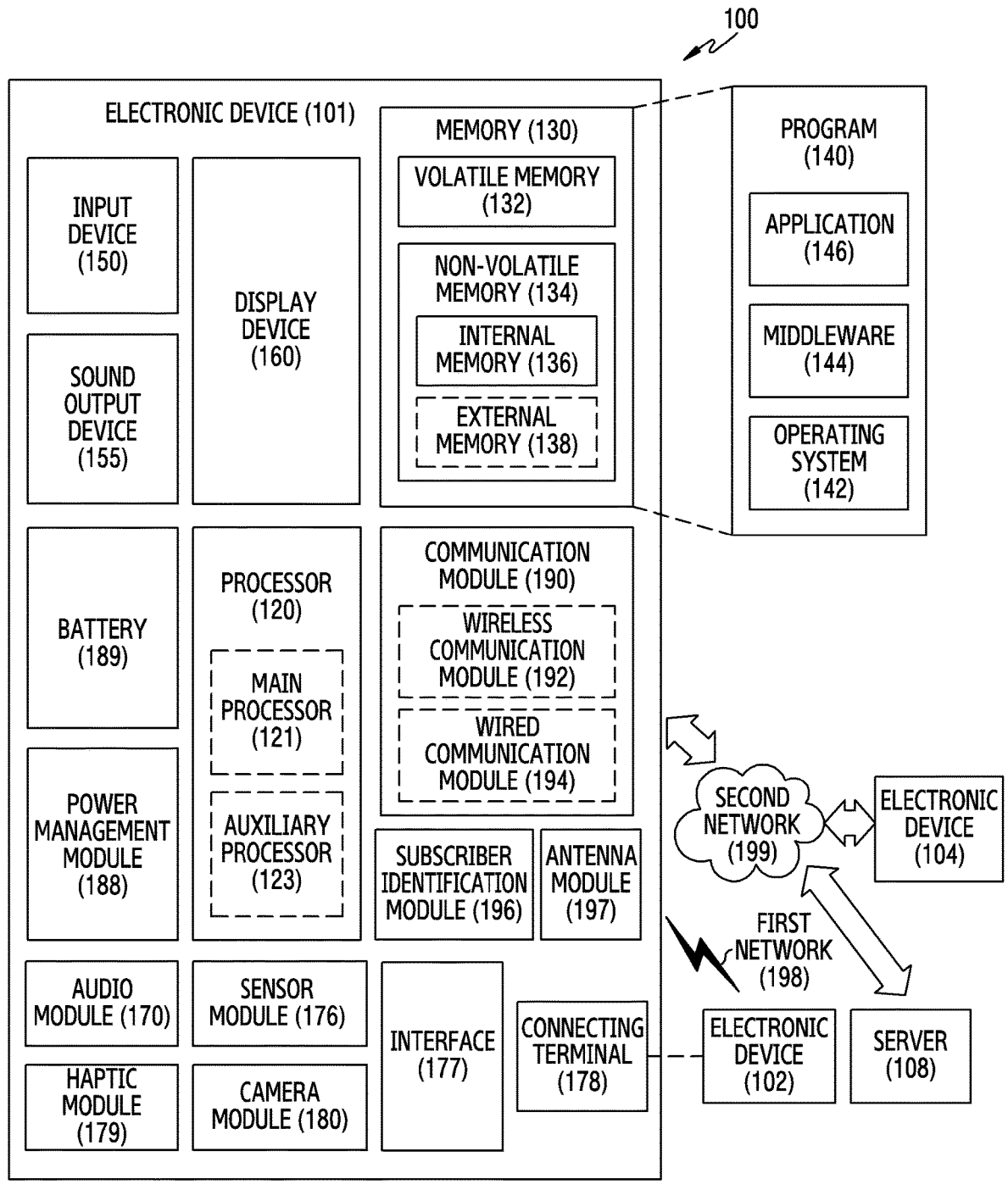
FIG. 1 is a block diagram of an electronic device in a network environment according to an embodiment.

FIG. 1 is a block diagram illustrating an electronic device 101 in a network environment 100 according to an embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
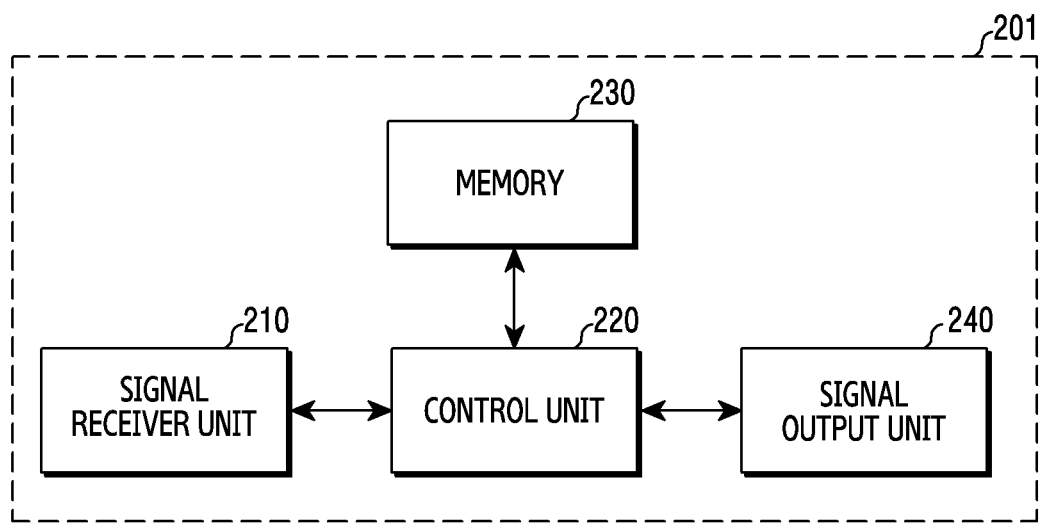
FIG. 2 is a block diagram of a smart assistant device according to an embodiment.

FIG. 2 is a block diagram of a smart assistant device according to an embodiment. Referring to FIG. 2, a smart assistant device 201 may include a signal receiver unit 210, a control unit 220, a memory 230, and a signal output unit 240. In various other embodiments, the components of the smart assistant device 201 are not limited to those in FIG. 2, and various other configurations (e.g., the components of FIG. 1) may be added, or at least one of the components of FIG. 2 may be omitted.

In an embodiment, the signal receiver unit 210 may receive a user's voice command. The voice command (or an input) may be, for example, a call command such as 'Hi, Bixby' and commands other than the call command. For example, the voice command may be divided into a first voice signal for calling a voice recognition function and a second voice signal corresponding to content of the voice command. The signal receiver unit 210 may transmit the received voice command to the control unit 220. The call command may be excluded from the transmitted voice command. For example, the signal receiver unit 210 may ignore or may not forward to the control unit 220 the call command, such that only the portion of the voice command other than the call command is forwarded. If the signal receiver unit 210 receives continuous voice commands, the signal receiver unit 210 may forward the voice commands without the call command to the control unit 220 when voice commands other than the initial voice command do not include the call command. The signal receiver unit 210 may include a microphone.

In an embodiment, the control unit 220 may recognize the voice command received from the signal receiver unit 210 using hardware or software adequately implemented for voice recognition. The hardware and software may be implemented as a voice recognition tool, a voice recognition module, a voice recognition engine, and so on. The control unit 220 may convert and analyze the voice command signal into a text format based on speech to text (STT). The control unit 220 may generate response data by analyzing the recognized voice command. The control unit 220 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In an embodiment, the control unit 220 may detect surrounding environment information of the smart assistant device 201 and user information, using a sensor unit (not shown). Through a wireless communication unit (not shown), the control unit 220 may receive a broadcasting and/or broadcasting related information, a radio signal, wireless data, and so on.

In an embodiment, the memory 230 may store data required for analyzing the received voice command and processing data. This data may be referred to as the control commands of the smart assistant device 201. The memory 230 may store data for supporting various functions of the smart assistant device 201. The memory 230 may store commands for operating a plurality of application programs or applications running on the smart assistant device 201, and the smart assistant device 201. At least some of the application programs may be downloaded from an external server through wireless communication. The control unit 220 may store the downloaded application programs in the memory 230, install them to the smart assistant device 201, and drive them to execute operations (or functions) of the smart assistant device 201. The control unit 220 may process various data required at the smart assistant device 201.

In an embodiment, the signal output unit 240 may transmit the data processed at the control unit 220 to other internal hardware/software block or an external device according to a designated output scheme. The output scheme of the signal output unit 240 may be determined or vary according to at least one of communication protocol, target device, and type of the output signal. The signal output unit 240 may include a speaker.

Although not depicted, the smart assistant device 201 may further include, if necessary, a communication interface for transmitting and receiving signals/data.

Figure 3:
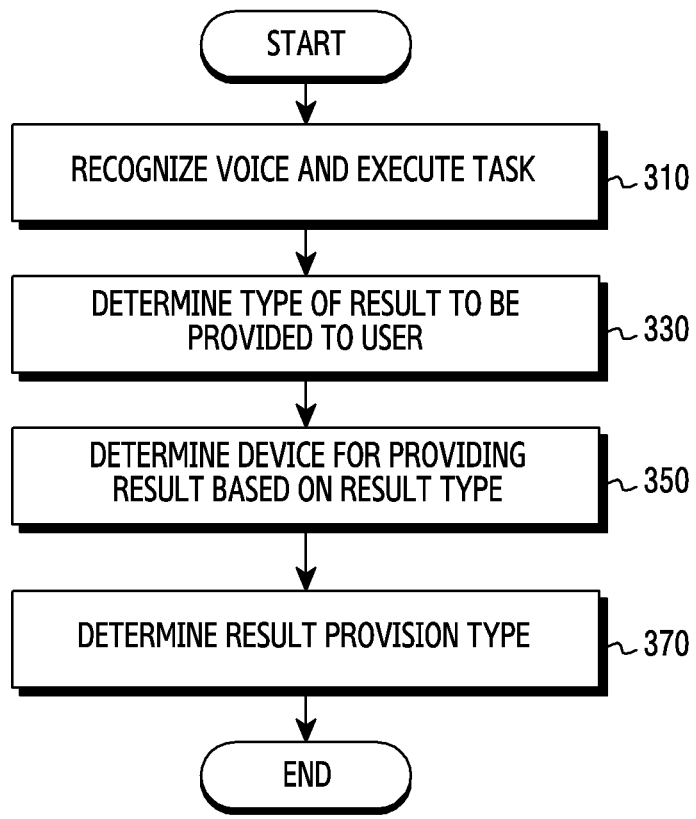
FIG. 3 is a flowchart of a process for providing a result in response to a user's command according to an embodiment.

FIG. 3 is a flowchart of a process for providing a result in response to a user's command according to an embodiment. The process of FIG. 3 may be performed using one or more electronic devices (e.g., the electronic device 101 of FIG. 1, the smart assistant device 201 of FIG. 2) or at least one processor of the electronic device. Operations described in FIG. 3 may be combined, the sequence of some operations may be changed, and some operation may be omitted. Hereafter, the "electronic device" may be understood as the electronic device 101 of FIG. 1 or the smart assistant device 201 of FIG. 2, or a processor or a control unit therein.

In this disclosure, a "result" provided to the user may include information of any type provided from the electronic device to the user. In an embodiment, the result provided to the user may include information of any type which the user may visually and/or aurally recognize. In an embodiment, the result provided to the user may include a final result of a task performed by the electronic device in response to the user's voice command. For example, in response to the user's music play command, music provided by the electronic device is included in the result provided to the user. In an embodiment, the result provided to the user may include information provided to the user to execute a task. For example, to book a table in a restaurant, the electronic device may auditorily or visually provide the user with information regarding a plurality of restaurants, such that restaurant information is included in the result provided to the user.

In operation 310, the electronic device may execute a task corresponding to the voice command in response to the user's voice command. Hereafter, the task may indicate a series of operations performed by the electronic device to provide the user with the result (or information) in response to the user's voice command. For example, the electronic device may receive a voice command including content which requests to find restaurants near a neighborhood of a city, and perform a task for searching for restaurants near that neighborhood in response to the voice command.

In an embodiment, the electronic device may receive a voice command including a call command from the user. For example, the voice command may include "Hi, Bixby." If the electronic device is in an inactive state (or a sleep state), the electronic device may switch to an active state in response to receiving the call command. Additionally or alternatively, if the voice recognition function is disabled, the electronic device may switch the voice recognition function to the active state in response to receiving the call command.

In another embodiment, the voice command may not include the call command. If the electronic device is already in the active state, it may perform a task in response to receiving the user' voice command which includes no call command.

In operation 330, the electronic device may determine the type of result to be provided to the user. In this disclosure, the result type refers to categories for result transmission. In an embodiment, the electronic device may determine at least one of various available types. For example, the electronic device may determine whether the type of the result to be provided to the user is a visually appropriate type (first type) or an auditorily appropriate type (second type). The visually appropriate type may indicate that the result to be provided to the user is appropriate for visual provision through a screen device, and the auditorily appropriate type may indicate that the result to be provided to the user is appropriate for auditory provision through a speaker.

In this disclosure, a visually/auditorily appropriate result may correspond to a result type that is a visually/auditorily appropriate type. A visually/auditorily appropriate task may generate a result of the visually/auditorily appropriate type. Notably, the result or a task, which is determined to be visually appropriate, is not limited to result provision through the screen device. Conversely, the result or a task, which is determined to be auditorily appropriate, is not limited to result provision through the speaker. For example, even the visually appropriate result may be provided to the user through the speaker in some cases. As another example, the electronic device may provide the visually appropriate result to the user using both of the screen device and the speaker. That is, the two devices may interact with the user at the same time, which shall be explained in FIG. 16A.

In an embodiment, whether a result is appropriate for the visual provision (i.e., the visually appropriate result) may be determined based on various criteria. In an embodiment, the electronic device may determine the type of the result to be provided to the user, based on the type of the task corresponding to the voice command and/or characteristics of the result acquired by executing the task.

In operation 350, the electronic device may determine a device for providing the result, based on the result type to be provided to the user. The result provision in this disclosure may include providing a voice output through the speaker or displaying information included in the result as an image through the screen device. In an embodiment, based on determining an auditorily appropriate result, the electronic device may determine the device for providing the result to the speaker. In an embodiment, based on determining the visually appropriate result, the electronic device may determine the result provision device to the screen device (e.g., a television).

In an embodiment, based on determining the visually appropriate result, the electronic device may search for the screen device. In this disclosure, the screen device may refer to a device including a display for visually providing the user with the result corresponding to the user's voice command. In an embodiment, the electronic device may search for the screen device near the electronic device (or the user). In an embodiment, the screen device near the electronic device may be a device placed in the same space as the electronic device. For example, if the electronic device is positioned in a living room of the user, the electronic device may scan the device such as a television or a computer in the living room which is the same space.

In an embodiment, the electronic device may provide the result through one of peripheral screen devices. In an embodiment, the electronic device may determine the screen device for providing the result, based on whether the result includes private information. In an embodiment, if a first screen device scanned is a public device or is positioned in an open place, the electronic device may provide the result including the private information through a second screen device which is different from the first screen device. For example, if the screen device near the user is a television which is commonly used by family members and the result includes private information, the electronic device may provide the result through a personal mobile device of the user, instead of the television.

In operation 370, the electronic device may provide the user with the result requested by the user. In an embodiment, the electronic device may provide a voice output through the speaker. In an embodiment, the electronic device may provide a visual result through the display of the screen device. In an embodiment, the electronic device may provide the voice output and the visual result using both of the speaker and the screen device.

In an embodiment, the electronic device may determine a scheme for providing the result, based on the location relationship between the user and the electronic device. In an embodiment, the electronic device may determine the scheme for providing the result, based on whether the screen device is within the user's view. In an embodiment, the electronic device may determine the result provision scheme based on whether the user's activity requires the view.

Figure 4:
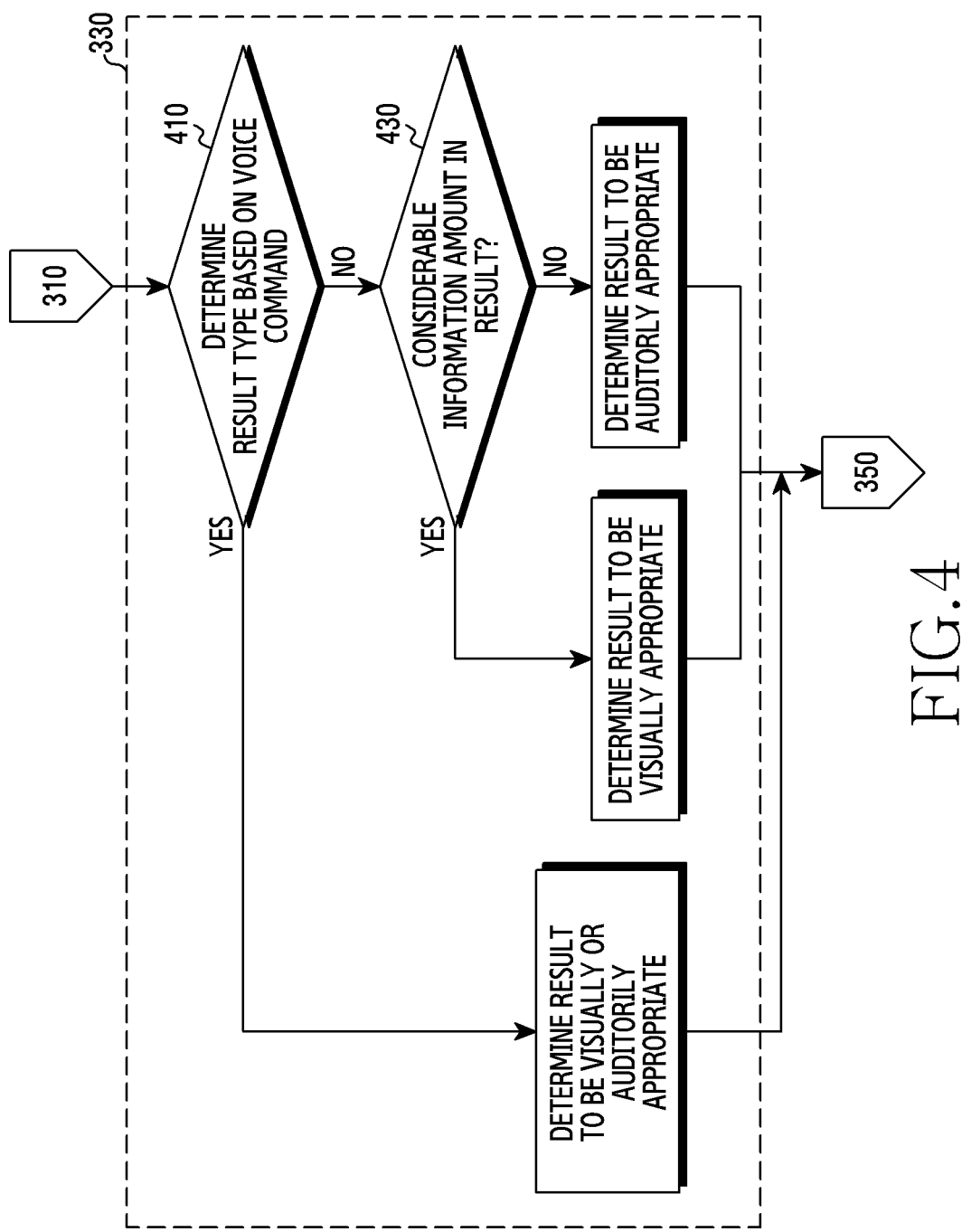
FIG. 4 is a flowchart of a process for determining a type of a result to be provided to a user according to an embodiment.

FIG. 4 is a flowchart of a process for determining a type of a result to be provided to a user according to an embodiment. In an embodiment, the process in FIG. 4 may be implemented as detailed operations of operation 330 of FIG. 3. In another embodiment, the process in FIG. 4 may be implemented independently of the process of FIG. 3, and may be appropriately combined with other processes of the disclosure.

In operation 410, the electronic device may determine the type of the result to be provided to the user, based on a voice command. In an embodiment, the electronic device may analyze the user's voice command and determine whether the user intends to receive the result through the screen device. For example, if the user's voice command includes contents asking to show specific information, the electronic device may determine the result to be provided to the user to be visually appropriate. In an embodiment, the electronic device may determine the type of the result to be provided to the user, based on the type of the task corresponding to the user's voice command. The task type may clarify which device is appropriate for the result provision. For example, in response to a music play command, the electronic device may determine an auditorily appropriate result corresponding to the command and play music through the speaker. On the other hand, in response to a video play command, the electronic device may determine a visually appropriate result corresponding to the command and play a video through the screen device.

In an embodiment, if it is difficult to determine which device is appropriate for result provision merely based on the user's voice command, the electronic device may perform operation 430.

In operation 430, the electronic device may determine the type of the result to be provided to the user, based on the amount of information included in the result acquired by executing the task corresponding to the user's command. In this disclosure, the information amount refers to how much information is contained in the result. For example, the information amount may be the number of candidate restaurants acquired by the electronic device in response to a restaurant search command. In another example, if the result is provided using voice output, the information amount may be the length of the voice script for the voice input. In yet another example, the information amount may be the number of dialogs required to execute the task commanded by the user.

In an embodiment, the electronic device may determine the type of the result to be provided to the user, based on whether the information amount contained in the result exceeds a designated amount. Based on the information amount exceeding the designated amount, the electronic device may determine that the result is more appropriate as a visually appropriate type of result to be provided to the user. Based on the information amount falling below the designated amount, the electronic device may determine that the result is more appropriate as an auditorily appropriate type of result to be provided to the user.

Figure 5:
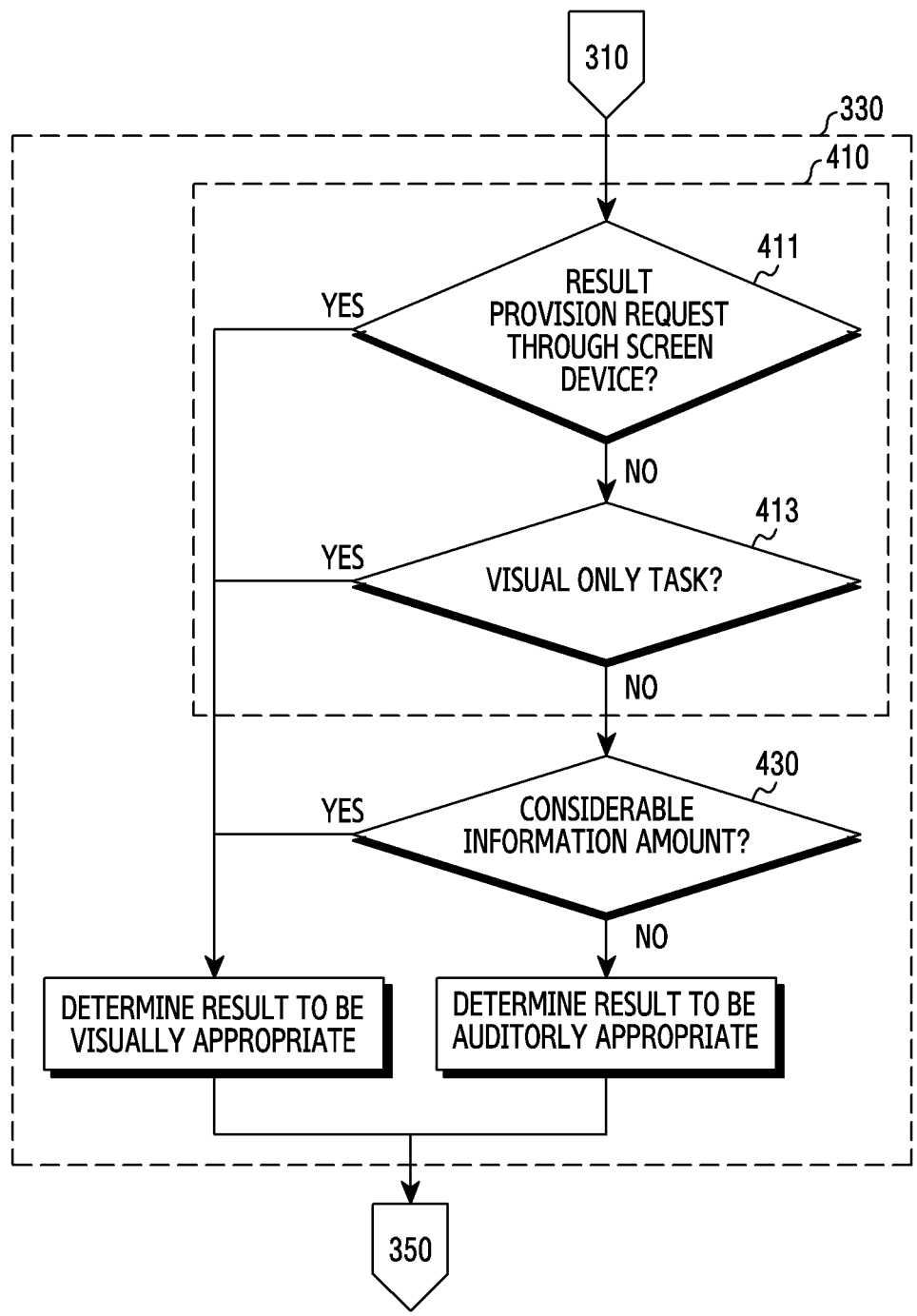
FIG. 5 is a flowchart of a process for determining a type of a result based on a user's voice command according to an embodiment.

FIG. 5 is a flowchart of a process for determining a type of a result based on a user's voice command according to an embodiment. Operation 411 and operation 413 in the process of FIG. 5 may be included in operation 410 of FIG. 4.

In operation 411, the electronic device may determine the type of the result to be provided to the user, based on whether result provision through the screen device is requested. In an embodiment, the electronic device may analyze the user's voice command and determine whether the user wants to directly receive the result visually (i.e., through the screen device). In an embodiment, if the user's voice command requests to show content, the electronic device may recognize the user's intention as result provision through the screen device. For example, if the user' voice command includes "show me," the user has indicated that he or she wants visual result provision and accordingly the electronic device may determine visual result provision. In an embodiment, based on the user's voice command which includes content for outputting the result through a specific screen device, the electronic device may determine visually appropriate result for the command. For example, if the user' voice command includes "Let me know on the television," the user has indicated that he or she wants result provision through the television which is the screen device and accordingly the electronic device may determine the visually appropriate result for the command.

In operation 413, the electronic device may determine the type of the result to be provided to the user, based on whether the task is a visual only task. The visual only task may include a task of which execution result must be provided visually. For example, a music video play task be a visual only task, because the result should be provided definitely through the screen device.

In an embodiment, the electronic device may determine the type of the result to be provided to the user, based on the task type corresponding to the user's voice command. In an embodiment, the electronic device may determine the type of the user's voice command, and determine based on the task type whether the task is visually appropriate or auditorily appropriate. Based on determining that the task requested by the user is visually appropriate, the electronic device may determine the visually appropriate type (first type) of the result to be provided to the user. Based on determining that the task requested by the user is auditorily appropriate, the electronic device may determine the auditorily appropriate type (second type) of the result to be provided to the user.

In an embodiment, the electronic device may use a table in which an appropriate modality is predesignated per task. In this disclosure, modalities may indicate a dialog scheme, a communication scheme, or an interaction scheme between the user and the electronic device. The task for which the modality using the screen device is appropriate may be designated to be the visually appropriate type, and the task for which the modality using the speaker is appropriate may be designated to be the auditorily appropriate type. An ambiguous task for using the screen device or the speaker may be designated to a visual/auditory composite type.

In an embodiment, if the task corresponding to the user's command is of the visual/auditory appropriate type, a task execution result may also be of the visual/auditory appropriate type. That is, the electronic device may execute the task of the visual/auditory appropriate type, determine the result acquired through the task to be the visual/auditory appropriate type, and provide the result through the screen device/speaker. In an embodiment, if the task corresponding to the user's command is determined to be the visual/auditory composite type, the electronic device may determine the result provision device through an additional process (e.g., operation 430).

An example of predesignating the appropriate modality per task is shown in Table 1. Table 1 is exemplary, and various modifications may be made.

TABLE 1

| Task type | Appropriate modality |
| --- | --- |
| Picture | Visually appropriate |
| Video | Visually appropriate |
| Map | Visually appropriate |
| Game | Visually appropriate |
| Hotel | Visual/auditory composite type |
| Restaurant | Visual/auditory composite type |
| Food ordering | Visual/auditory composite type |
| Taxi call | Visual/auditory composite type |
| Music | Auditorily appropriate |
| Radio | Auditorily appropriate |
| Podcast | Auditorily appropriate |

In an embodiment, the electronic device may compare the task requested by the user using the voice command with the tasks of Table 1, and interact with the user using the modality corresponding to (or matching) the task. For example, if the task to be executed by the electronic device is a game in response to the user's voice command, the electronic device may determine the corresponding task as visually appropriate based on the predesignated table (e.g., Table 1) and provide the game through the screen device. For example, if the task to be executed by the electronic device is a music related task (e.g., music play) in response to the user's voice command, the electronic device may determine the corresponding task as auditorily appropriate and provide the music through the speaker. For example, if the task to be executed by the electronic device is food ordering in response to the user's voice command, the electronic device may determine the corresponding task as auditorily appropriate using the additional process (e.g., operation 430) and provide the result through the speaker. The embodiment of Table 1 is exemplary and does not limit the disclosure. For example, in another embodiment, some of the auditorily appropriate tasks in Table 1 may provide their result through the screen display. For example, if the number of music sources or albums acquired in response to a command for playing music of a particular musician exceeds a designated number, the electronic device may display a corresponding result as a list on the screen device.

Figure 6A:
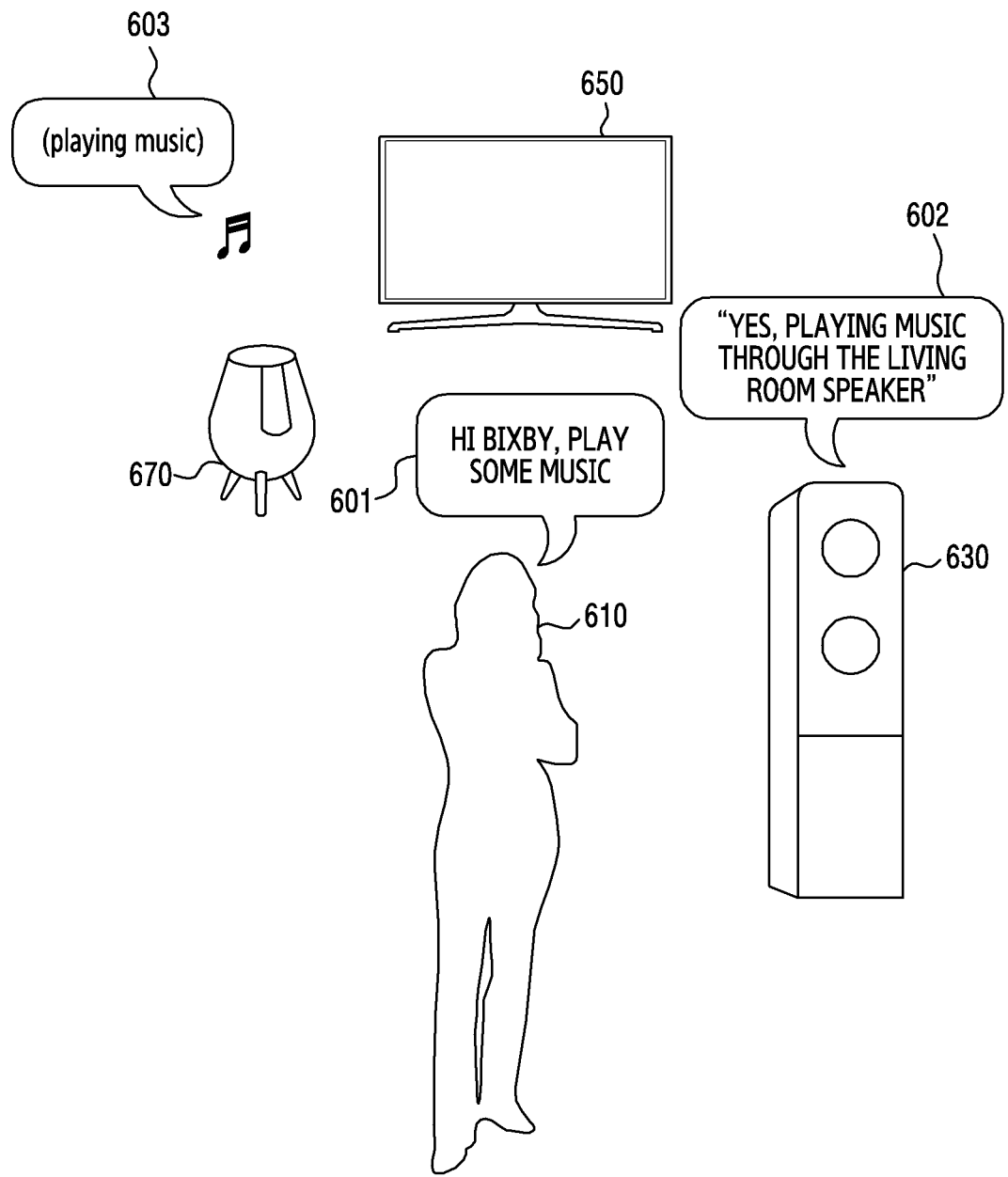
FIG. 6A is an example in which an electronic device receives a user's voice command (or input) and provides a result to a user according to an embodiment.
Figure 6B:
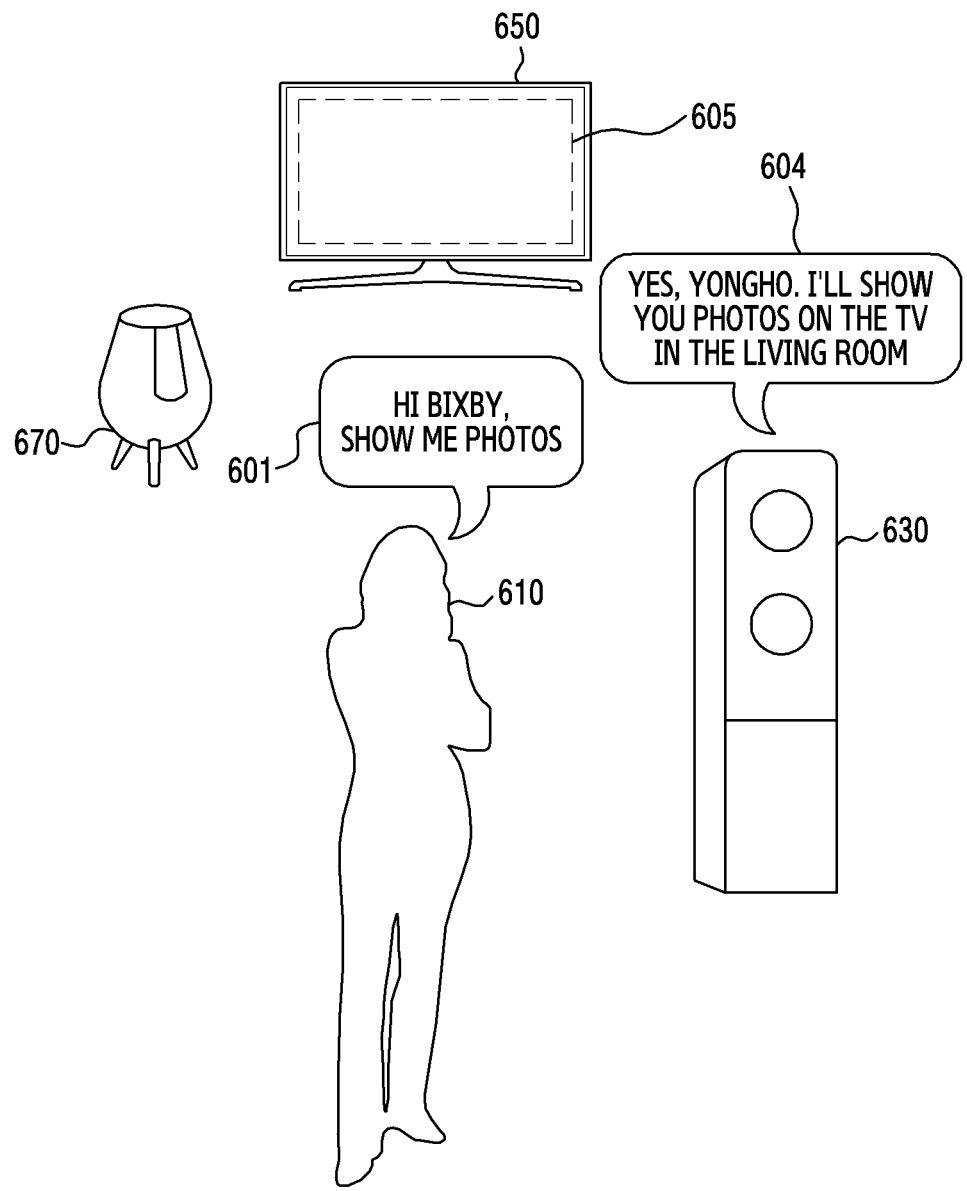
FIG. 6B is an example in which the electronic device receives the user's voice command (or input) and provides the result to the user according to an embodiment.

FIG. 6A and FIG. 6B illustrate examples in which an electronic device receives a user's voice command (or input) and provides a result to the user according to an embodiment. In the following descriptions based on FIG. 6A and FIG. 6B, the "electronic device" may be the electronic device 101 of FIG. 1 or the smart assistant device 201 of FIG. 2.

Referring to FIG. 6A, the electronic device may provide the result corresponding to the user's command through the speaker. In an embodiment, the electronic device may receive the user's voice command, and execute a task corresponding to the voice command. In this embodiment, an electronic device 630 may determine the auditorily appropriate task corresponding to the command of the user 610, and provide the result through the speaker 670. A voice command 601 ("Hi Bixby, play some music") of the user 610 includes content for music play. The electronic device 630 may recognize the voice command 601 as the direction for performing a task which retrieves and plays music. Since the music play task merely provides the result through the speaker 670 without using a screen device 650, the electronic device 630 may determine the music play task to be an auditorily appropriate task. The electronic device 630 may control the speaker 670 to play music 603 in response to the voice command 601. In this embodiment, the music 603 is played through the speaker 670 which is a different device from the electronic device 630 which receives the voice command 601 and performs the task. The electronic device 630 may transmit music data to the speaker 670 through wireless communication. The electronic device 630 may provide a voice output 602 indicating that the music requested by the user 610 is outputted through the speaker 670.

Referring to FIG. 6B, the electronic device 630 may provide the result corresponding to the voice command 601 of the user 610 through the screen device 650. In this embodiment, the electronic device 630 may determine that the task corresponding to the command 601 of the user 610 is visually appropriate, and provide the result through the screen device 650 (e.g., a television). The voice command 601 ("Hi Bixby, show me photos") of the user 610 includes content for showing photos. The electronic device 630 may recognize the voice command 601 which directs a task for displaying photos on the display. Since the user 610 intends to visually receive the photos, the electronic device 630 may determine the photo display task as a visually appropriate task. Hence, the electronic device 630 may display the photos on the screen device 650. In this embodiment, the electronic device 630 displays photos 605 on the screen device 650 around the user 610. The electronic device 630 may transmit photo data to the screen device 650 through the wireless communication. The electronic device 630 may provide a voice output 604 ("I'll show you photos on the TV in the living room") indicating which device outputs the photos.

Figure 7:
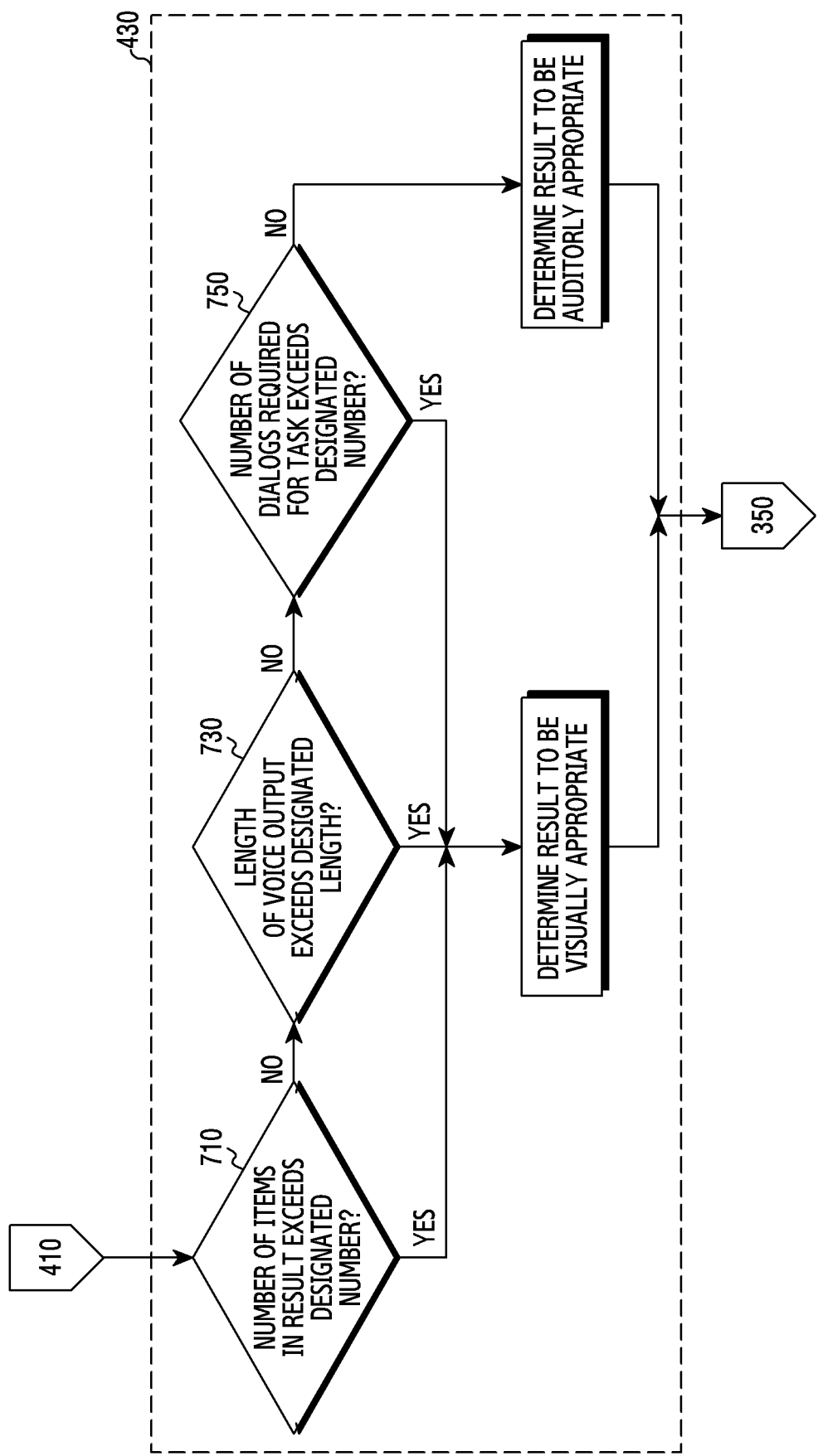
FIG. 7 is a flowchart of a process for determining a type of a result based on an amount of information included in the result to be provided to a user according to an embodiment.

FIG. 7 is a flowchart of a process for determining a result type based on an information amount included in the result to be provided to a user according to an embodiment. The process of FIG. 7 may be included in operation 430 of FIG. 4. The sequence of operations of the process of FIG. 7 may be changed, and some operation may be omitted. For example, the electronic device may perform operation 750 and then operation 710. For example, the type of the result to be provided to the user may be determined in operation 710 and operation 730, without operation 750.

Referring to FIG. 7, the electronic device may determine the result type based on the information amount in the result to be provided to the user. In an embodiment, the information amount may correspond to the number of items in the result to be provided to the user. For example, if the electronic device acquires a result including a plurality of restaurants in response to a user's restaurant search request, the searched restaurants may correspond to items in the result and the number of the restaurants may correspond to the number of the items. The number of the items in the result may correspond to the information amount in the result. In an embodiment, if the corresponding result is outputted using the voice, the information amount may correspond to the length of a voice script corresponding to the voice output. For example, if the electronic device provides a voice output indicating a recipe in response to a user's pasta recipe request, the number of characters in the voice script corresponding to the voice output may correspond to the information amount to be provided to the user. In an embodiment, the information amount may correspond to the number of parameters (or variables) or dialogs required in the task corresponding to the user's voice command. For example, if the user requests to book a table in a restaurant, the electronic device may request from the user parameters such as a date, a venue, a menu, the number of persons for the restaurant reservation. The electronic device may acquire the parameters required for the restaurant reservation, through a plurality of dialogs with the user. The number of the parameters or the number of the dialogs required for the restaurant reservation may correspond to the information amount to be provided to the user.

In operation 710, the electronic device may determine result types based on the number of the items in the result to be provided to the user. In an embodiment, if the number of the items exceeds a designated number, the electronic device may determine the result to be of the visually appropriate type to be provided to the user. If the number of the items falls below the designated number, the electronic device may determine the result to be of the auditorily appropriate type to be provided to the user. For example, if acquiring a result of five restaurants (i.e., five items) in response to the user's restaurant search request, the electronic device may provide the result including five restaurant information through the screen device.

In operation 730, the electronic device may provide the result type based on the length of a voice output required to provide the result to the user. In this disclosure, the length of the voice output may correspond to the length of the voice script corresponding to the voice output or a play time of the voice output. In an embodiment, if the result includes information provided using voice output, the electronic device may determine the result type based on the length of the voice script corresponding to the information. A long script may indicate considerable information contained. Accordingly, if the result including considerable information is provided to the user using only voice output, efficiency of the information delivery may deteriorate. In an embodiment, the electronic device may raise the efficiency of the information delivery by visually providing the result that includes considerable information through the screen device, instead of providing the voice output. In an embodiment, if the number of characters (or words) in the voice script exceeds a designated number, the electronic device may determine the result is visually appropriate to be provided to the user. If the number of the characters (or words) in the voice script falls below the designated number, the electronic device may determine the result is auditorily appropriate to be provided to the user. For example, if the number of the characters in the voice script exceeds 30 characters, the electronic device may provide the result through the screen device.

In an embodiment, the electronic device may determine the result type based on an expected play time of the voice script. If the information amount included in the result is considerable even when the corresponding voice output is played fast, the result may be determined to be visually appropriate result. Based on the play time exceeding a designated time, the electronic device may determine the result to be visually appropriate to be provided to the user. Based on the play time shorter than the designated time, the electronic device may determine the result to be auditorily appropriate to be provided to the user.

In operation 750, the electronic device may select a device for providing the result based on complexity of the task. In an embodiment, the electronic device may determine the type of the result to be provided to the user based on the number of dialogs (or parameters) required for the task corresponding to the user's command. The complexity of the task may be proportional to the number of dialog steps. For example, if the user wants to book a table in a restaurant, the electronic device may gather various parameters (e.g., date, venue, menu, time, the number of persons or preferred seat type) to recommend an appropriate restaurant to the user. In an embodiment, the electronic device may gather necessary parameters for the task by creating a plurality of dialogs with the user. A single dialog may include requesting particular information of the electronic device and acquiring a user's response. For example, one dialog may include a voice output for selecting one of candidate restaurants provided by the electronic device and the user's voice response. As the number of the dialogs increases, it may be hard for the user to keep track of his or her responses. Hence, the electronic device may visually provide task related information through the screen device, thus providing convenience to the user.

In an embodiment, if the number of the dialogs (or the parameters) required for the task corresponding to the user's command exceeds a designated number, the electronic device may determine the result to be visually appropriate to be provided to the user. If the number of the dialogs (or the parameters) required for the task corresponding to the user's command is smaller than the designated number, the electronic device may determine the result to be auditorily appropriate to be provided to the user. For example, if the number of the dialogs required for the task corresponding to the user's command exceeds two, the electronic device may provide results of the dialog steps through the screen device.

Figure 8A:
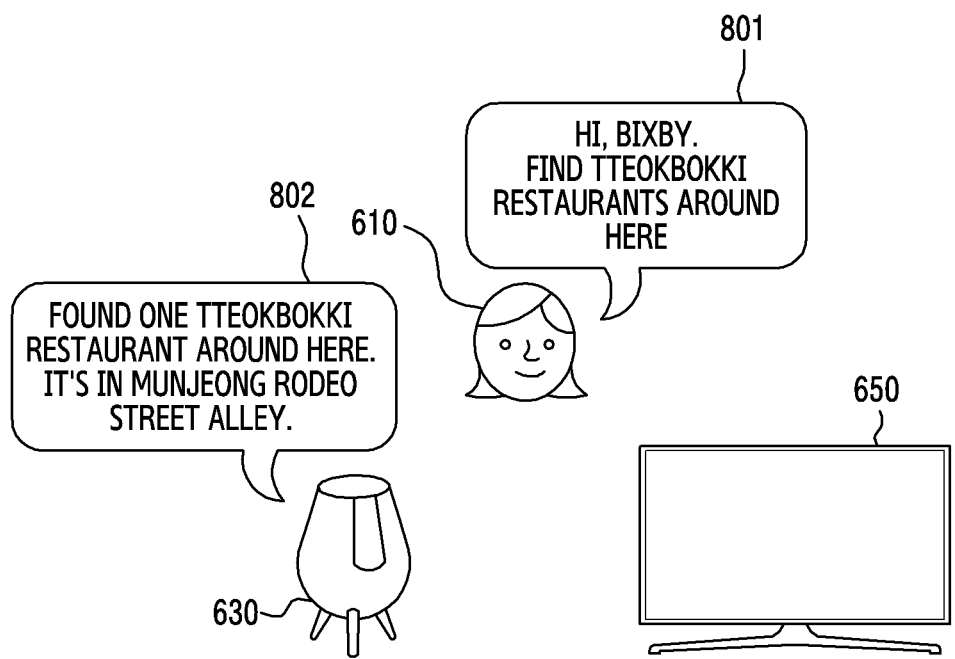
FIG. 8A is an example of providing a result based on the number of items included in the result according to an embodiment.
Figure 8B:
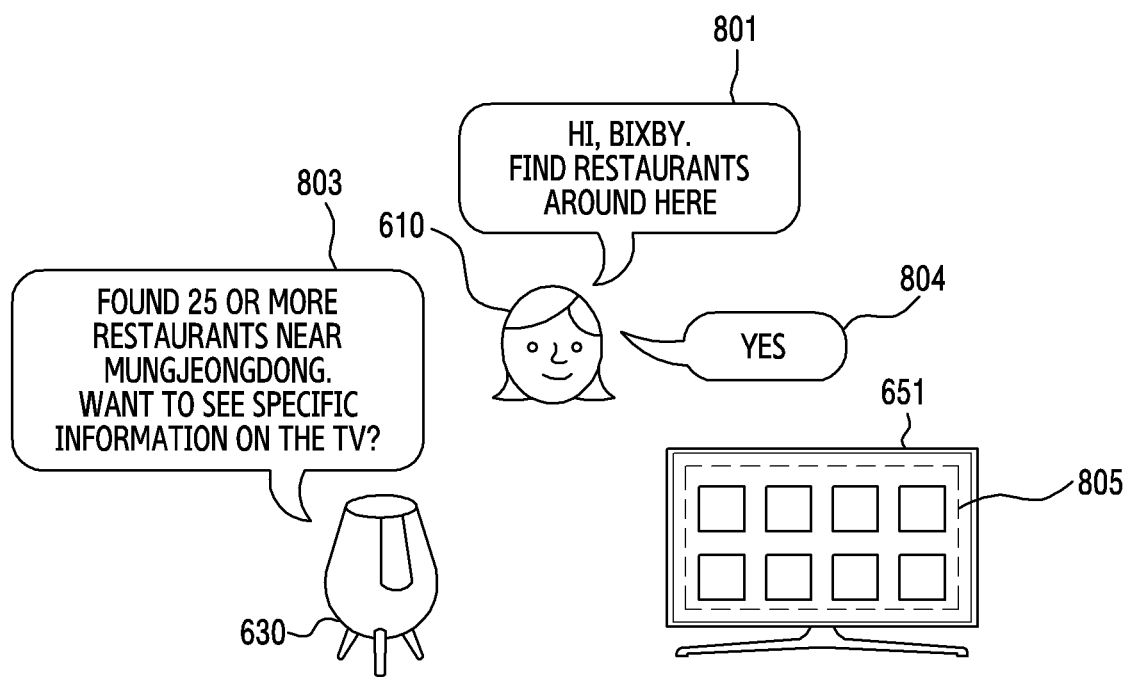
FIG. 8B is an example of providing the result based on the number of the items included in the result according to an embodiment.

FIG. 8A and FIG. 8B illustrate examples of providing a result based on the number of items included in the result according to an embodiment. FIG. 8A and FIG. 8B illustrate that the result provision scheme differs according to an information amount contained in the result in response to similar voice commands. A speaker which provides a voice output is the speaker of the electronic device 630.

Referring to FIG. 8A, in response to a voice command 801 of the user 610, the electronic device 630 may provide a result through the speaker. The voice command 801 of the user 610 includes content for searching for restaurants in the vicinity, and the electronic device 630 may perform a task for searching the vicinity for restaurants based on current location information of the electronic device 630. If detecting one restaurant, the electronic device 630 may provide a voice output including corresponding restaurant information through the speaker of the electronic device 630. If the number of items in the result is small (one), the electronic device 630 may maintain the efficiency of the information delivery though the electronic device 630 by not visually providing the result through the screen device 650.

Referring to FIG. 8B, in response to the voice command 801 of the user 610, the electronic device 630 may provide a result through the screen device 650. The voice command 801 of the user 610 includes the content for searching for restaurants in the vicinity, and the electronic device 630 may perform the task for searching the vicinity for the restaurants based on the current location information of the electronic device 630. If detecting 25 restaurants in vicinity, the result output of the 25 restaurants merely using the voice lowers the efficiency of the information delivery. To prevent this, the electronic device 630 may determine the visually appropriate result to be provided to the user, and provide the corresponding result through the screen device 650. In this embodiment, the electronic device 630 may provide a voice output 803 including the number of the items in the result and a suggestion for whether to receive the result through the screen device 650. Based on a voice response 804 of the user 610 intending to receive the results through the screen device 650 as suggested by the electronic device 630, the electronic device 630 may provide restaurant information 805 through the screen device 650. For example, the electronic device 630 may provide the restaurants as a list through the screen device 650.

Figure 9A:
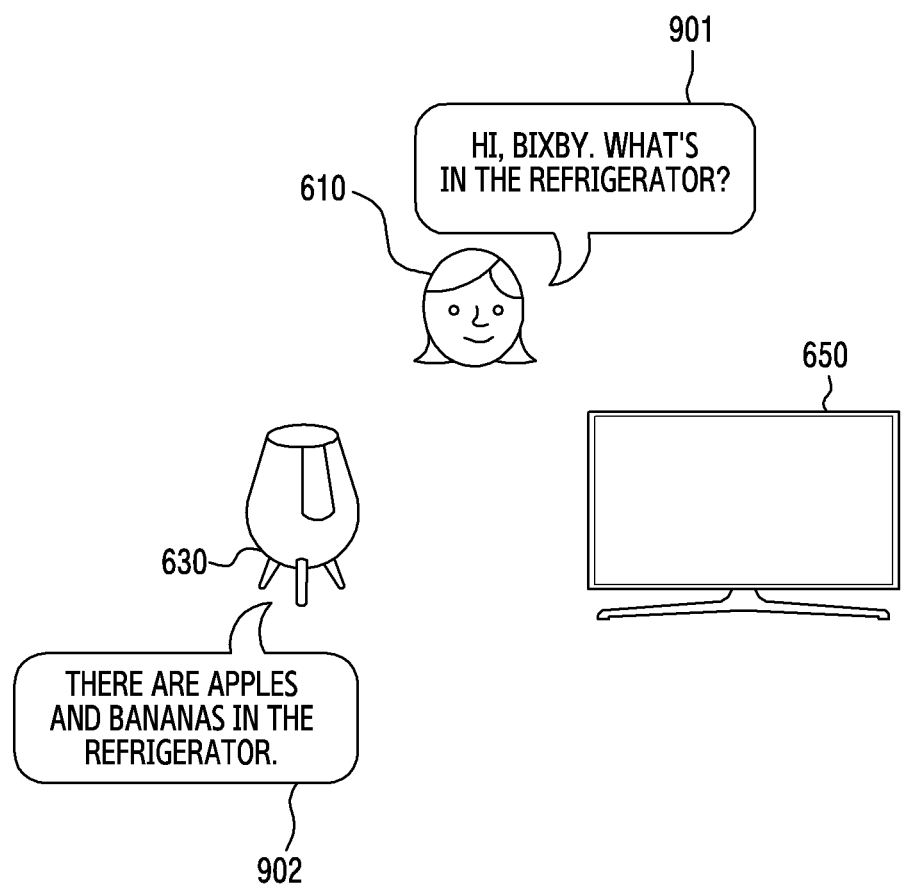
FIG. 9A is an example of providing a result based on a voice script length according to an embodiment.
Figure 9B:
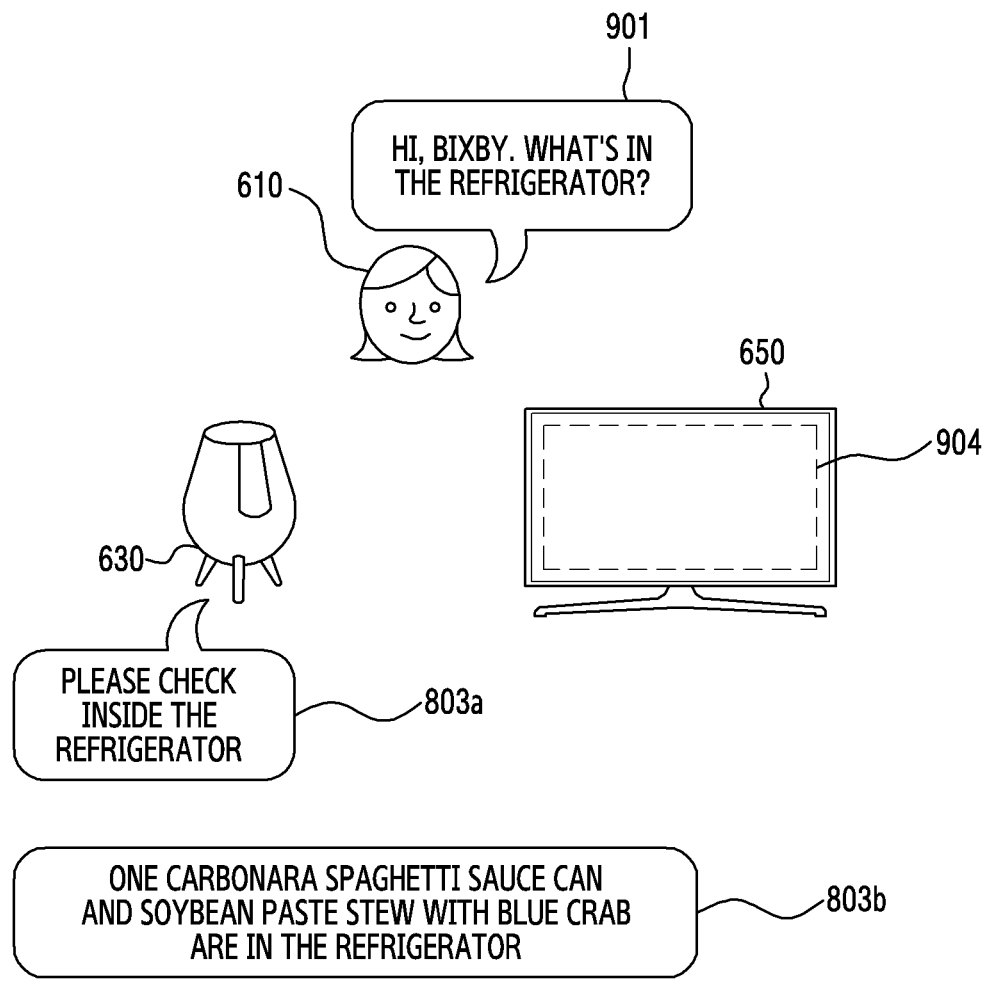
FIG. 9B is an example of providing the result based on the voice script length according to an embodiment.

FIG. 9A and FIG. 9B illustrate examples of providing a result based on a voice script length according to an embodiment. FIG. 9A and FIG. 9B illustrate that the result provision scheme differs according to the information amount contained in the result in response to the same voice command. A speaker which provides a voice output corresponding to the result is the speaker of the electronic device 630.

Referring to FIG. 9A, in an embodiment, the electronic device 630 may provide a voice output 902 having a short script through the speaker, without the screen device 650. That is, a result provided as the voice output of the short script may be determined to the auditorily appropriate result. In this embodiment, in response to a voice command 901 of the user 610 who asks about which items are in a refrigerator, the electronic device 630 may provide a voice output 902 including content that apples and bananas are in the refrigerator, through the speaker. Because the voice output is relatively short, the efficiency of the information delivery is not degraded. That is, in response to the result including little information, the electronic device 630 may provide the user 610 with the result corresponding to the command execution using the voice output 902, without using the screen device 650.

Referring to FIG. 9B, in an embodiment, the electronic device 630 may determine the visually appropriate result based on the long length of the expected voice output. In this embodiment, in response to the voice command 901 of the user 610 who asks about which items are in the refrigerator, the electronic device 630 may provide a long result that includes information on various items in the refrigerator such as one carbonara spaghetti sauce can, soybean paste stew with blue crab, etc. If the length of the voice script 803b generated to provide the result using the voice output exceeds a designated length, the electronic device 630 may provide a refrigerator inside image 904 through the screen device 650. The refrigerator inside image 904 may be captured by a camera disposed inside the refrigerator. In this embodiment, the electronic device 630 may provide the voice script 803a indicating that the result is provided through the screen device 650.

Figure 10:
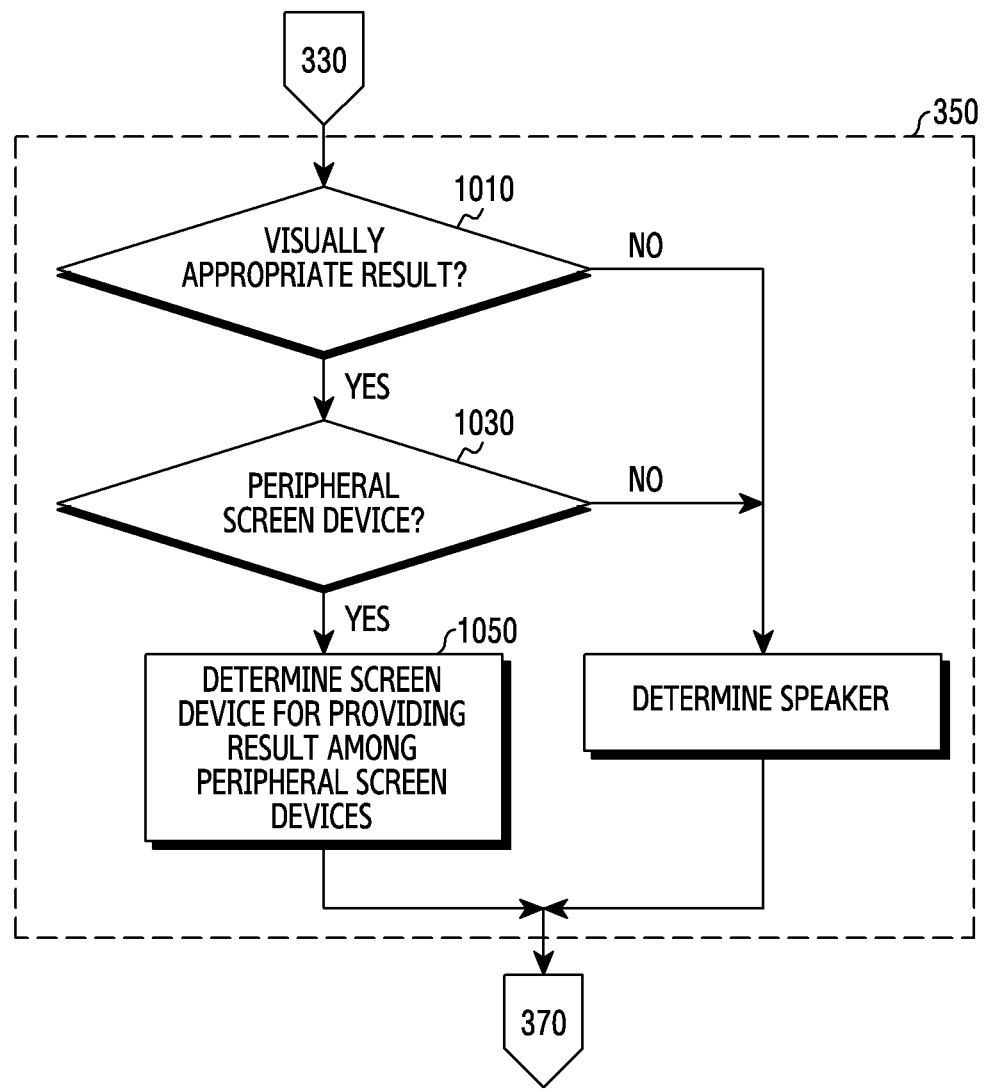
FIG. 10 is a flowchart of a process for determining a device to provide a result based on a type of the result to be provided to a user according to an embodiment.

FIG. 10 is a flowchart of a process for determining a device to provide a result based on a type of the result to be provided to a user according to an embodiment. The process of FIG. 10 may be included in operation 350 of FIG. 3.

In operation 1010, if the result to be provided to the user is of the auditorily appropriate type, the electronic device may determine the speaker for outputting the result. The electronic device may provide the voice output using, but not limited to, its speaker in an embodiment, but the electronic device may provide the user with the voice output corresponding to the result through other electronic device including a speaker in another embodiment.

In operation 1030, the electronic device may search for a screen device for outputting the visually appropriate result. In an embodiment, the electronic device may scan at least one screen device (hereafter, a 'peripheral screen device') near the electronic device or the user. In an embodiment, screen device candidates for receiving data from the electronic device and outputting the result may be registered in one account, e.g. the user's account. In an embodiment, the screen device candidates for outputting the result may be connected to the same access point (AP) (e.g., a wireless router).

In an embodiment, the electronic device may determine the most appropriate screen device for providing the result among the peripheral screen devices. In an embodiment, the electronic device may provide the result through the screen device which is closest to the user. In an embodiment, the electronic device may detect the screen device in the same space as the electronic device. For example, if the electronic device is in the living room, the electronic device may determine the television in the living room to the screen device for providing the result. In another example, if the electronic device is in the kitchen, the electronic device may determine the refrigerator in the kitchen, which has a display, to the screen device for the result provision.

In an embodiment, the user may register the spaces where various electronic devices are disposed in advance. For example, the user may register the speaker and a first television in the living room, the refrigerator in the kitchen, and a second television in the great room, through a separate application. The smart speaker may provide the result through the screen in the same space as the smart speaker, in response to the user's voice command. For example, if the smart speaker is in the kitchen, the smart speaker may provide the result through the refrigerator which includes a display in the same space as the smart speaker, in response to the user's voice command.

In an embodiment, the electronic device may determine the screen device which hears the user's voice command most loudly, as the screen device for providing the result. In an embodiment, which devices hears the user's voice command most loudly may be determined by comparing signal strengths corresponding to the voice command acquired at the devices. For example, the screen device for providing the result to the user may be determined as the device which hears the call command (e.g., Hi, Bixby) most loudly and one that includes a display among the electronic devices connected to the same AP.

In an embodiment, if the peripheral electronic devices do not exist or are not available (e.g., the screen device has no power supply), the electronic device may provide the result through the speaker. That is, even for visually appropriate results that contain considerable information and are not appropriate for voice output provision may be provided through the speaker according to the absence or the state of the peripheral screen devices.

In operation 1050, the electronic device may determine the screen device for the result provision among the peripheral electronic devices. In an embodiment, the electronic device may determine the screen device for providing the result, according to the information contained in the result. In an embodiment, the electronic device may provide the result through a personal screen device, instead of the public screen device, based on the result including private information. If the result including private information is provided through the public screen device, the private information may be disclosed to others. Hence, the electronic device may determine whether or not the result includes the private information, before displaying the result on the screen device, and determine the result provision device to a screen device which is less likely to disclose the private information to others.

Figure 11:
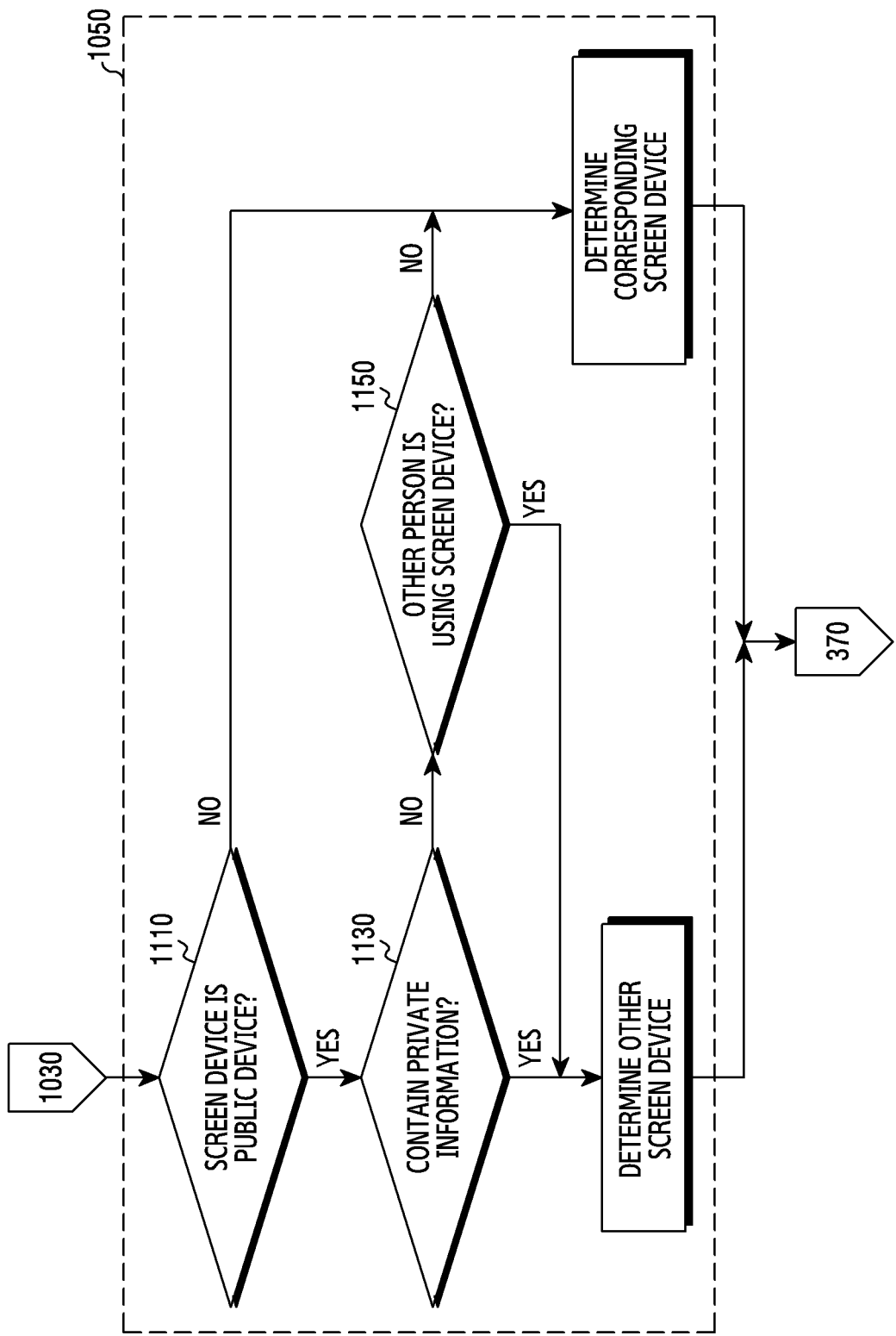
FIG. 11 is a flowchart of a process for determining a screen device which minimizes private information exposure according to an embodiment.

FIG. 11 is a flowchart of a process for determining a screen device which minimizes private information exposure according to an embodiment. The process of FIG. 11 may be included in operation 1050 of FIG. 10.

In operation 1110, based on whether a peripheral screen device is a public device, the electronic device may determine whether to provide the result through other screen device (or a second screen device), instead of the corresponding screen device (or a first screen device). In this disclosure, a public device may be a device available to several persons or a device having a screen exposed to unspecified persons in the space of the corresponding public device. For example, the television in the living room, which may be used by several persons, may be the public device. In an embodiment, based on determining that the peripheral screen device is not a public device, the electronic device may provide the result through the screen device. If the screen device is not public, the result provided through the screen device, which contains the private information, is less likely to expose the private information to others. In an embodiment, based on determining that the peripheral screen device is a public device, the electronic device may provide the result through another screen device.

Operation 1130 and operation 1150 are described based on determining that the screen device is a public screen device. The other screen device shown in the figure may be distinguished from the public screen device.

In operation 1130, the electronic device may determine the screen device for outputting the result, based on whether the result includes the private information. In an embodiment, based on determining that the result includes the private information, the electronic device may provide the result through other screen device (or a second screen device), instead of the public screen device (or a first screen device). In this disclosure, the other screen device (or the second screen device) for providing the result instead of the public screen device (or the first screen device) may be, but not limited to, one of the peripheral screen devices of the electronic device, and the second screen device may be in a different space from the electronic device in another embodiment.

In an embodiment, the electronic device, after determining that the result contains the private information, may provide the result through the public screen device according to the user's consent. The electronic device may provide a voice output which asks the user about whether to receive the result through the public screen device, and provide the result through one of the public screen device or the other screen device, based on a user's response to the corresponding voice output.

In an embodiment, based on whether there is other person near the public screen device, the electronic device may determine whether to provide the result including the private information through the public screen device. In an embodiment, based on determining another person who is not the user is near the first screen device (or the public screen device) of the peripheral screen devices, the electronic device may provide the result including the private information through the second screen device (or a non-public screen device) instead of the first screen device. If the result provided through the public screen device contains the private information but there is no person other than the user near the public screen device, it is less likely to disclose the private information to others and accordingly the electronic device may provide the result including the private information through the public screen device.

In an embodiment, based on whether there is another person near the public screen device, the electronic device may provide a voice output asking the user about whether to receive the result through the public screen device. For example, if there is no other person near the public screen device and user's consent is received, the electronic device may provide the result including the private information through the public screen device.

In operation 1150, the electronic device may determine a screen device for providing the result so as to not interrupt another person's screen device usage. In an embodiment, the electronic device may determine the screen device for providing the result, based on whether the other person is using the public screen device. In an embodiment, if the other person is using the public screen device, the electronic device may provide the result through the other screen device. For example, if family members including the user are watching television and the result is displayed on the television, the television watching of the family members may be interrupted and thus the electronic device may provide the result through user's other device. In an embodiment, based on determining that another person is not using the public screen device and the user solely uses the public screen device, the electronic device may provide the result through the public screen device.

In another embodiment, if determining that another person is using specific content through the public screen device, the electronic device may provide the result through the public screen device according to characteristics of the content. For example, if the content is a static picture and the screen device serves as a digital frame for displaying a picture, even if technically another person is using the public screen device, the result provision of the electronic device through the screen device may not interrupt the screen device use of the other person.

Figure 12A:
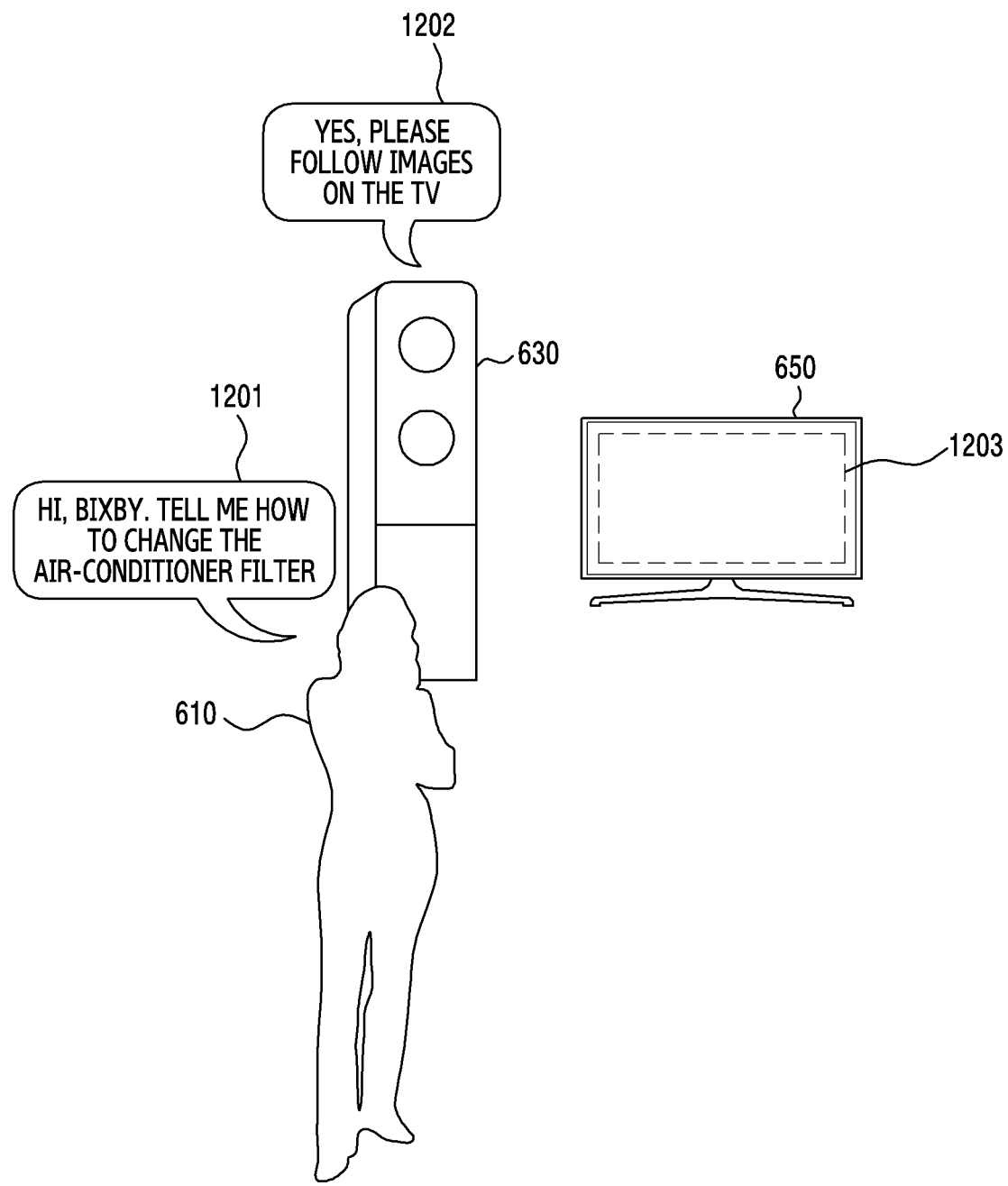
FIG. 12A illustrates an example in which a screen device for providing a result changes according to whether the result to be provided through the screen device includes private information according to an embodiment.
Figure 12B:
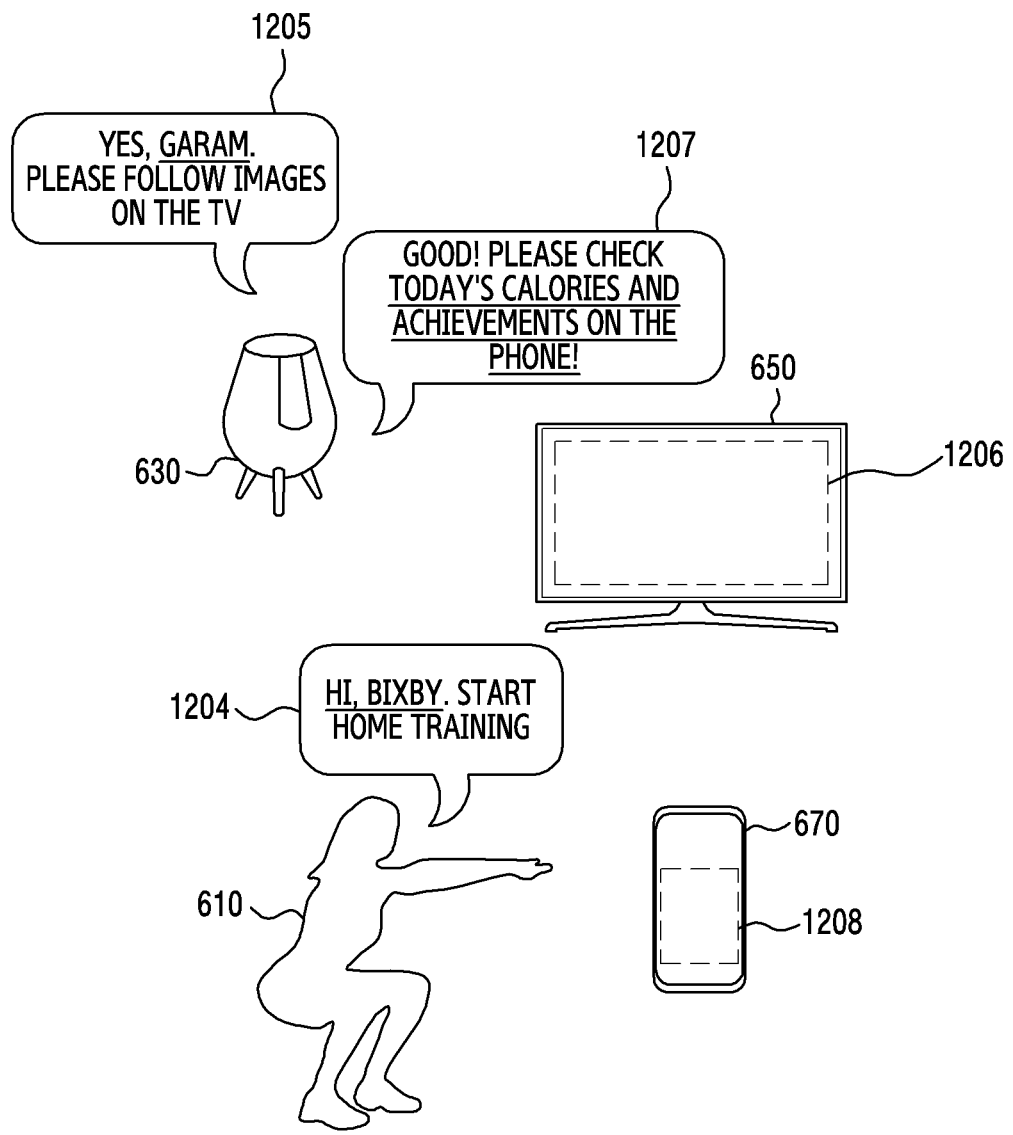
FIG. 12B illustrates an example in which the screen device to providing a result changes according to whether the result to be provided through the screen device includes the private information according to an embodiment.

FIG. 12A and FIG. 12B illustrate examples in which a screen device for providing a result changes according to whether the result to be provided through the screen device includes private information according to an embodiment.

Referring to FIG. 12A, the electronic device 630 provides a result through the screen device 650 in response to a voice command 1201 of the user 610. The voice command 1201 of the user 610 includes content asking about how to replace an air-conditioner filter. Since the method for replacing the air-conditioner filter does not include private information of the user 610, the electronic device 630 may provide the result corresponding to the voice command 1201 of the user 610, through a television 1210 which is the public screen device. In this embodiment, the electronic device 630 provides a voice output 1202 for identifying the result on the television 1210, and displays information 1203 related to the air-conditioner filter replacement on the television 1210.

Referring to FIG. 12B, the electronic device 630 provides a result through a personal mobile device 1220 in response to a voice command 1204 of the user 610. The voice command 1204 of the user 610, which is related to home training, may include private information. In this embodiment, in response to the voice command 1204 of the user 610, the electronic device 630 may provide a training guide video 1206 through the television 1210. The training guide video 1206, which does not include private information, may be provided through the television 1210 which is the public device, but a home training result (e.g., calorie consumption, goal achievement) may include the private information such as weight information. Hence, if the result is provided through the television 1210, user's privacy may be invaded. In this embodiment, the electronic device 630 may protect the user's private information by providing the result including the private information through a personal mobile device 1220 of the user 610, instead of the television 1210. The electronic device 630 may provide a voice output 1207 notifying that the result is provided through the personal mobile device 1220, and the personal mobile device 1220 may display a result 1208.

Figure 13A:
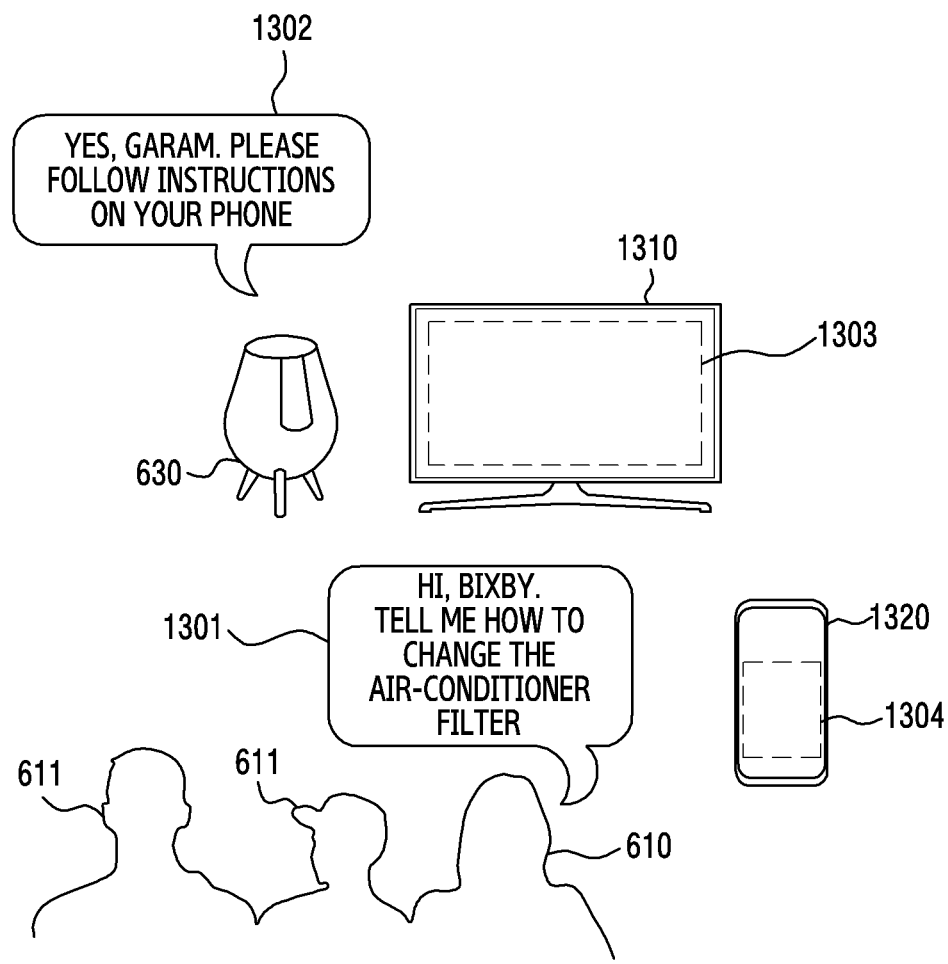
FIG. 13A illustrates an example in which a screen device for providing a result changes according to whether other person uses a public screen device according to an embodiment.
Figure 13B:
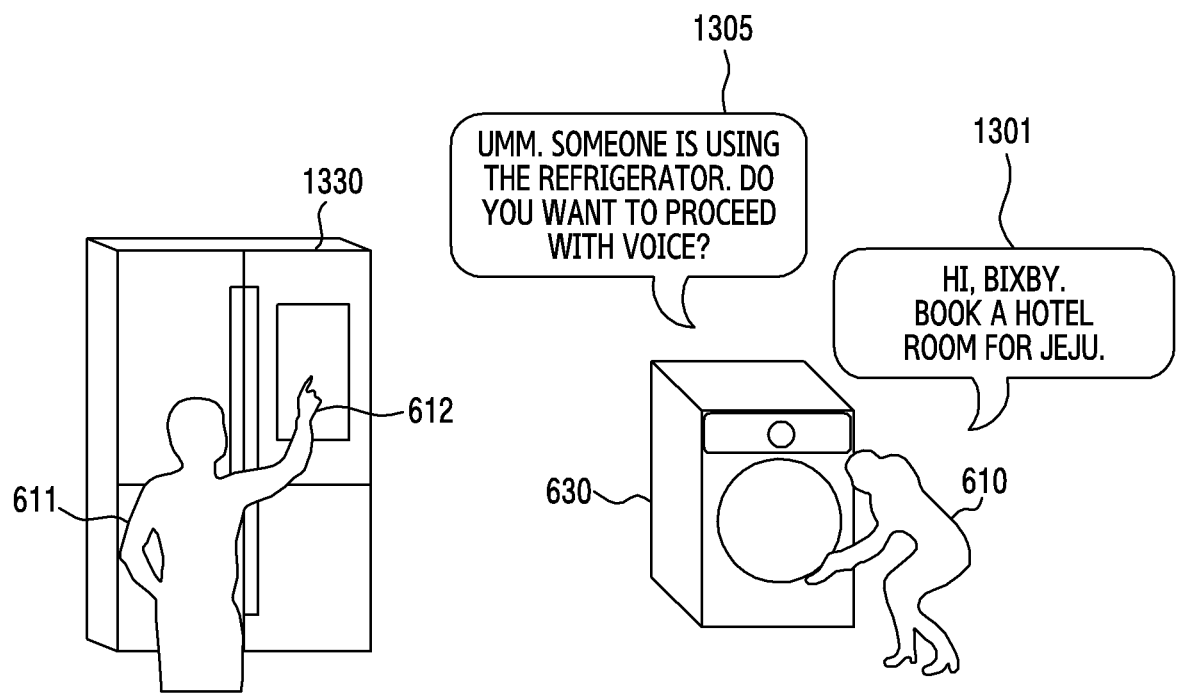
FIG. 13B illustrates an example in which the screen device for providing the result changes according to whether other person uses the public screen device according to an embodiment.
Figure 13C:
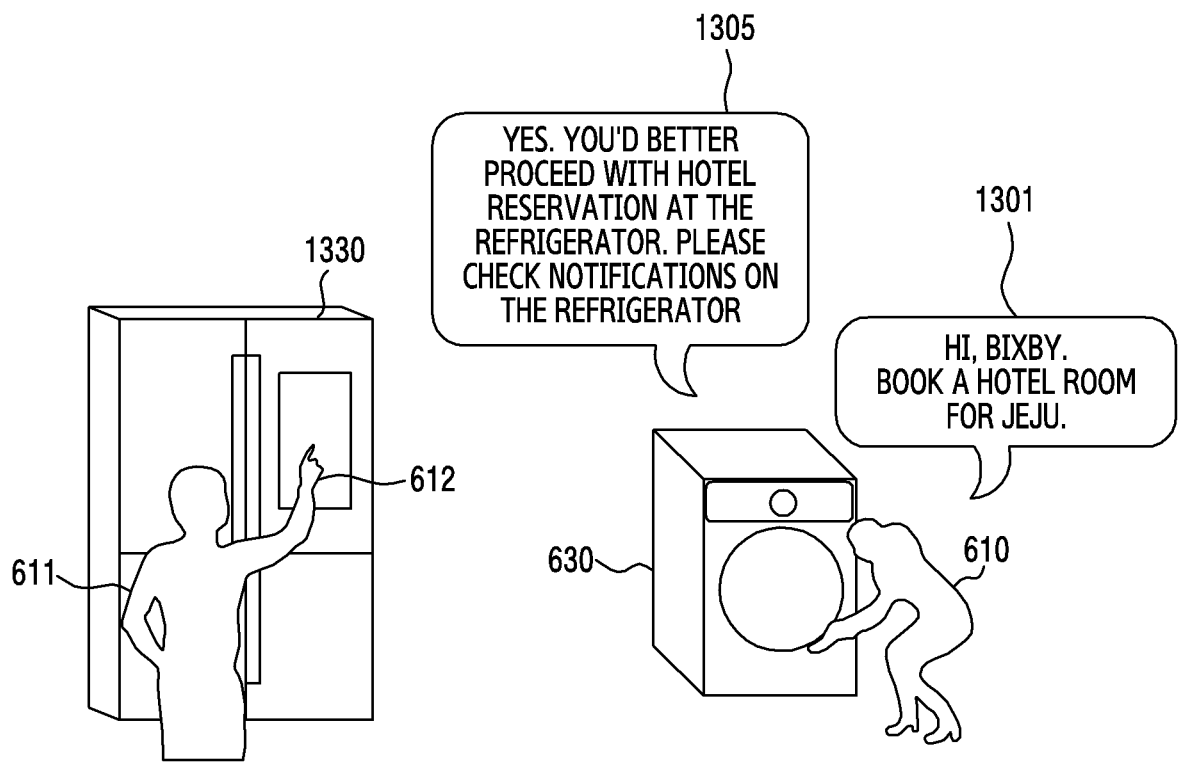
FIG. 13C illustrates an example in which the screen device for providing the result changes according to whether other person uses the public screen device according to an embodiment.

FIG. 13A, FIG. 13B, and FIG. 13C illustrate examples in which a screen device for providing a result changes according to whether other person uses a public screen device according to an embodiment.

Referring to FIG. 13A, the electronic device 630 provides a result through a personal mobile device 1320 so as to not interrupt television 1310 watching of other persons 611. A voice command 1301 of the user 610, which is related to air-conditional filter replacement and is irrelevant to the private information of the user 610, may not invade the privacy even in the provision through the television 1310. However, if the result is provided through the television 1310, content 1303 provided already on the television 1310 may be covered by images related to the result or the sound volume of the content 1303 may be reduced to thus interrupt the television 1310 watching of the other persons 611. Hence, the electronic device 630 may provide the result 1304 requested by the user 610 through the personal mobile device 1320 of the user 610 instead of the television 1310, so as to not interrupt the television 1310 watching of the other persons 611.

Referring to FIG. 13B, the electronic device 630 converses with the user 610 using voice so as to not interrupt the screen device use of the other person 611. In this embodiment, the screen device for the result output is the refrigerator 1330 in the kitchen where the electronic device 630 is also disposed. A voice command 1301 of the user 610 includes content for hotel reservation, and the electronic device 630 may determine a hotel reservation task to a visually appropriate task due to a large number of dialogs required. Hence, ideally the electronic device 630 may provide hotel reservation information through a display of the refrigerator 1330. But if the result corresponding to the voice command 1301 of the 610 is provided through the refrigerator 1330 while the other person 611 operates the display of the refrigerator 1330, the use of the refrigerator 1330 of the other person 611 may be interrupted. To prevent this, the electronic device 630 may determine whether the other person 611 is using the screen of the refrigerator 1330, and thus converse with the user 610 using voice, instead of the screen of the refrigerator 1330. Whether the other person 611 is using the screen of the refrigerator 1330 may be determined by interaction history such as touch inputs to the screen of the refrigerator 1330 or physical key inputs of the refrigerator 1330. In this embodiment, the electronic device 630 may notify the user 610, using voice, that the refrigerator 1330 is occupied by the other person 611, and provide a voice output 1305 asking of whether to proceed the hotel reservation via voice interactions.

Referring to FIG. 13C, the electronic device 630 may provide a notification on the screen of the refrigerator 1330 so as to not interrupt the use of the refrigerator 1330 of the other person 611. In this embodiment, the electronic device 630 may display a notification related to the hotel reservation on the refrigerator 1330 and provide its related voice output 1305 to the user 610 using voice. Since the electronic device 630 does not provide the result immediately on the screen of the refrigerator 1330 in response to the voice command 1301 of the user 610, the other person 611 is not interrupted in using the refrigerator 1330. The user 610 may access the screen of the refrigerator 1330 after the other person 611 finishes the use of the refrigerator 1330, and receive hotel reservation information (or result) by interacting with the notification.

Figure 14:
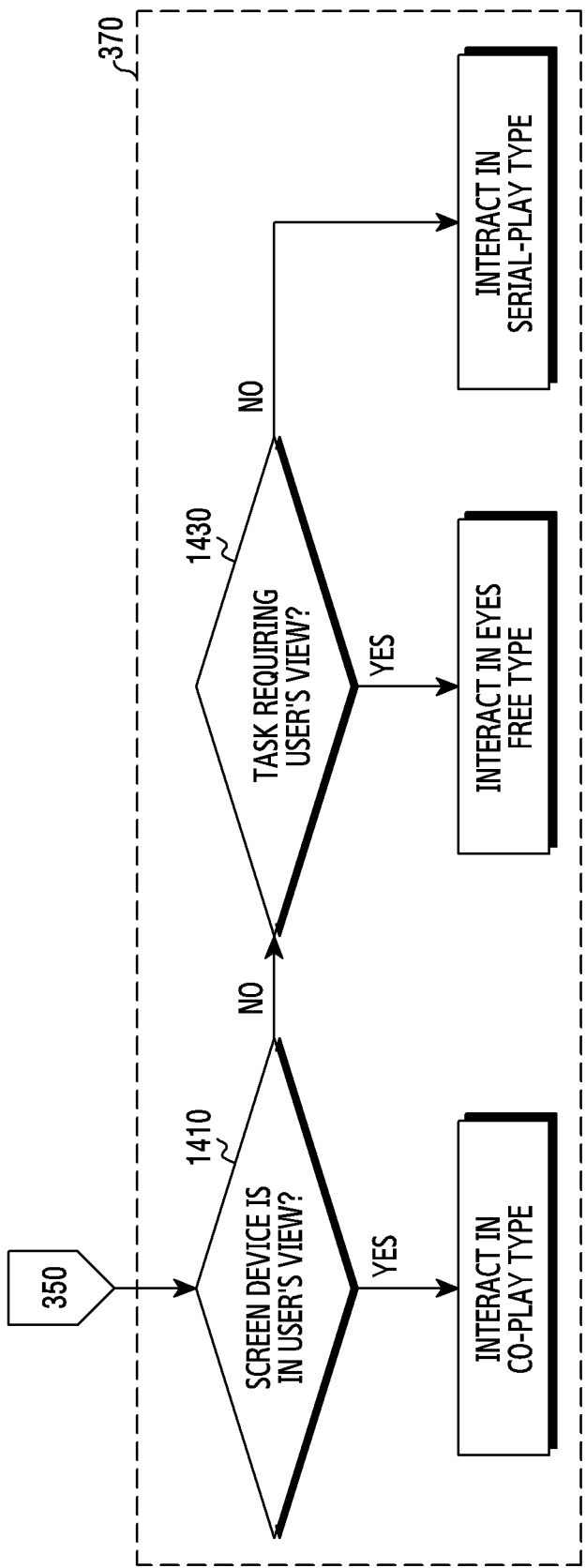
FIG. 14 is a flowchart of a process for determining how an electronic device interacts with a user according to an embodiment.
Figure 15A:
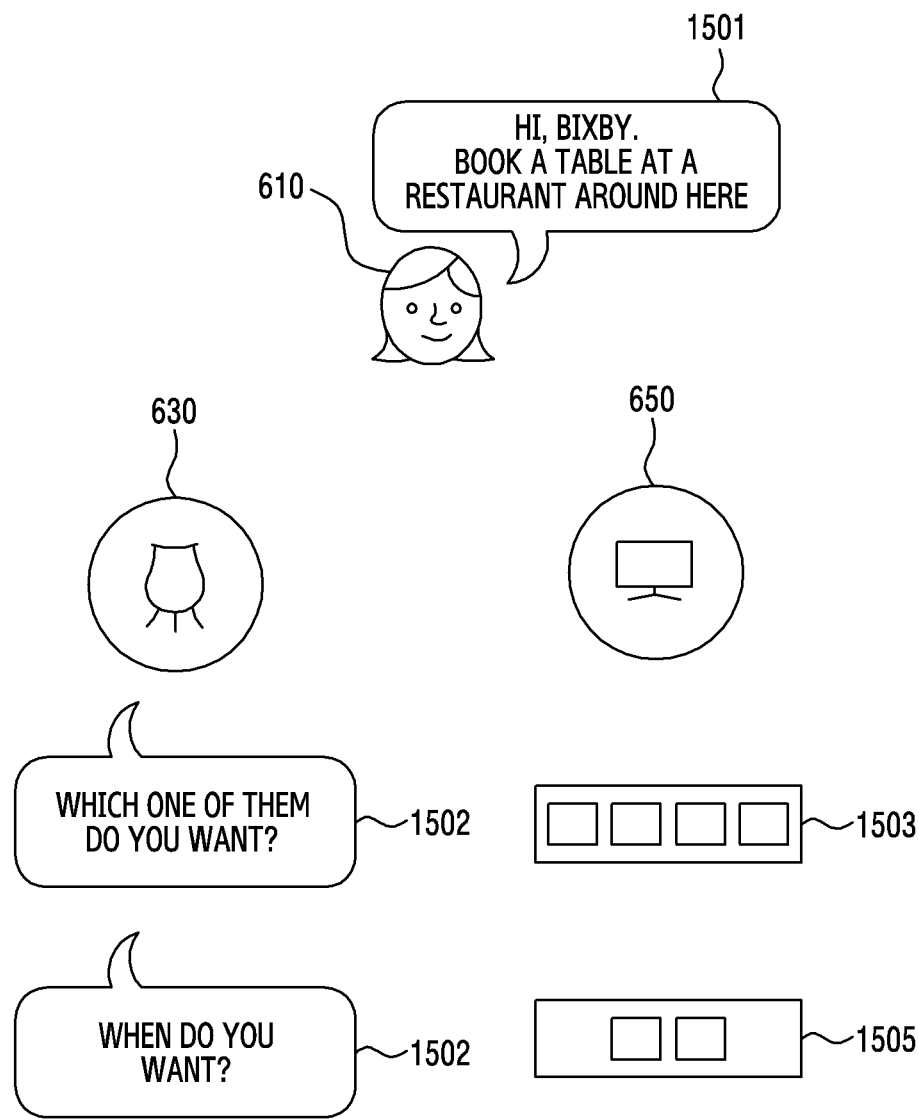
FIG. 15A illustrates an interaction of a co-play type according to an embodiment.
Figure 15B:
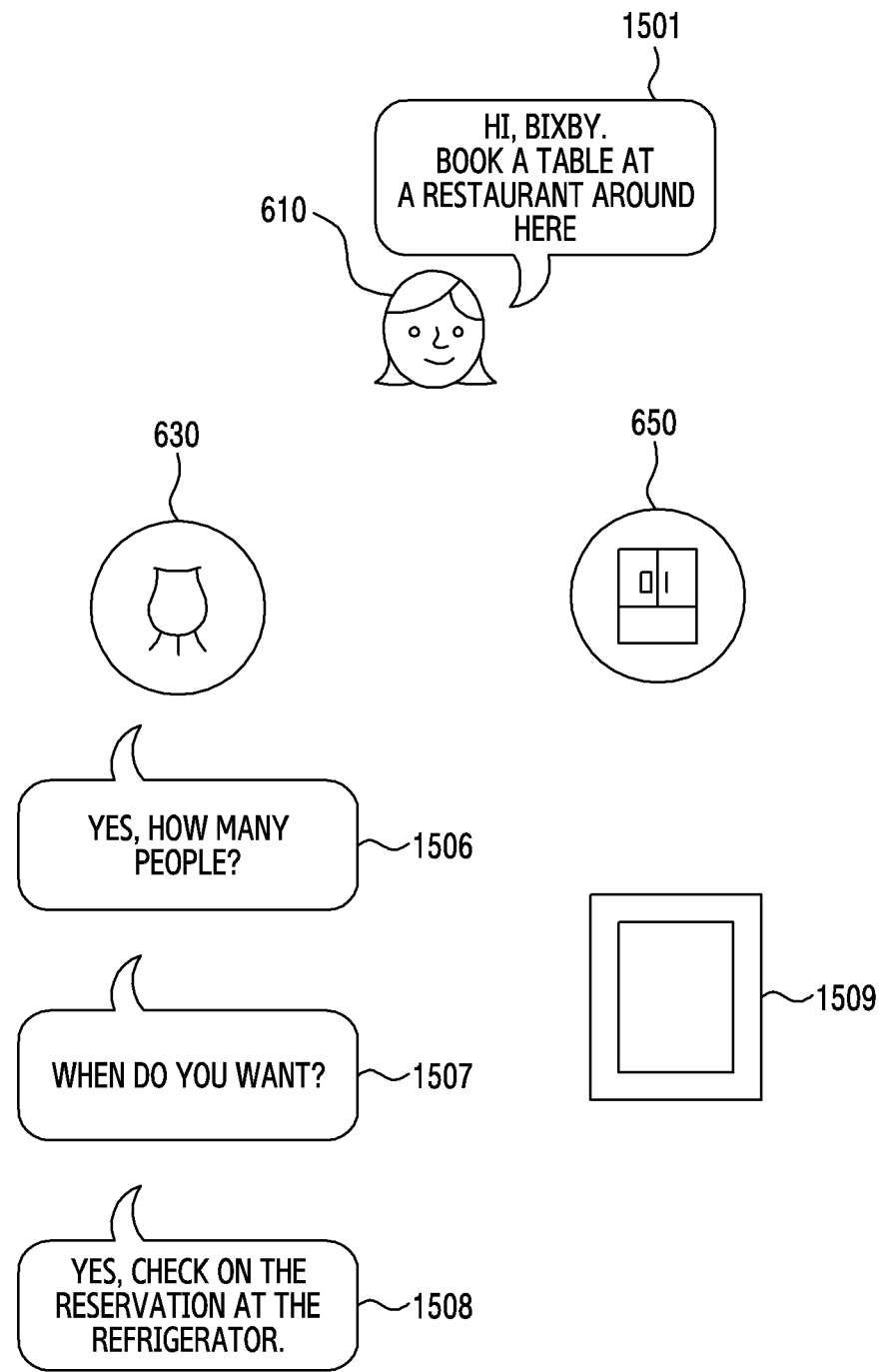
FIG. 15B illustrates an interaction of a serial-play type according to an embodiment.

FIG. 14 is a flowchart of a process for determining how an electronic device interacts with a user (hereafter, an 'interaction type') according to an embodiment. The process of FIG. 14 may be included in operation 370 of FIG. 3. FIG. 15A and FIG. 15B illustrate interactions of a co-play type and a serial-play type according to an embodiment.

In an embodiment, the electronic device may provide various interaction types. In an embodiment, the electronic device may provide a type (hereafter, a co-play type) (or a first type) for interacting with the user while outputting voice and concurrently providing visual information through the screen device. In an embodiment, the electronic device may provide a type (hereafter, a serial-play type) (or a second type) for conversing with the user only using the voice and displaying only a final result on the screen device. In an embodiment, the electronic device may provide a type (hereafter, an eyes free type) (or a third type) for providing a feedback using only the voice without providing the visual information (i.e., without using the screen device).

In an embodiment, in the co-play type, two devices may interact with the user at same time. In an embodiment, the speaker and the screen device may provide information corresponding to the user's voice command at the same time. The electronic device may provide a task execution result to the user or request an input for an additional task, by providing first information (or auditory feedback) through the speaker and providing second information (or visual feedback) through the screen device. In the co-play type according to an embodiment, the auditory feedback or the visual feedback alone may not provide whole information to the user, and the whole information may be provided to the user using the two feedbacks at the same time.

Referring to FIG. 15A, the electronic device 630 may provide information related to a voice command 1501 using the screen device 650 in response to the voice command 1501 of the user 610. For example, the electronic device 630 may search for restaurants, and provide an image 1503 including candidate restaurants through the screen device 650 based on the number of the searched restaurants exceeding a designated number. The electronic device 630 may provide a voice output 1502 for the user 610 to select one of the candidate restaurants displayed on the screen device 650. If the user 610 selects one restaurant, the electronic device 630 may provide a voice output 1504 for requesting a reservation date from the user 610. The electronic device 630 may request the reservation date from the user 610 and provide available reservation dates as an image 1505 on the screen device 650. As such, the electronic device 630 may provide a result (or information) through the screen device 650 and provide the voice output 1504 requesting a response from the user 610 in relation to the result displayed on the screen.

In an embodiment, in the serial-play type, two or more devices sequentially interact with the user. In an embodiment, the serial-play type may interact with the user through the speaker at a first time and interact with the user through the screen device at a second time. Referring to FIG. 15B, the electronic device 630 may have a plurality of dialogs 1506, 1507, and 1508 with the user 610 using voice in response to the voice command 1501 of the user 610, and then visually provide only a final result 1509 (i.e., a reservation receipt) through the screen device 650 in an embodiment. The electronic device 630 may gather necessary information (e.g., the number of persons, a date, etc.) for the restaurant reservation through the dialogs 1507, 1507 and 1508 with the user 610. The electronic device 630 may have the dialogs 1507, 1507 and 1508 using voice alone, and provide the final result 1509 corresponding to the restaurant reservation command 1501 through the screen device 650.

In an embodiment, the eyes free type may be applied if the user's view is not free. During the interaction of the eyes free type, the electronic device may provide information to the user using only the speaker, without using the screen device. Since the interaction between the user and the electronic device uses only voice, the user may focus his/her eyes on a separate task that the user is undertaking. Hence, the eyes free type may be applied if the user may not see the screen or needs to fix his/her eyes on another task.

In operation 1410, the electronic device may determine the interaction type based on whether the user may easily receive the result (or the information) through the screen device. In an embodiment, the electronic device may determine the interaction type, based on the location relation between the user and the electronic device. In an embodiment, the electronic device may determine the interaction type, according to a posture of the user relative to the screen device. In an embodiment, the electronic device may determine the interaction type, based on whether the user's view includes the screen device. In this disclosure, the user's view may indicate a range sighted by the user without considerably moving. For example, if the user's view does not include the screen device but the user is able to see the screen device by merely moving his/her head while maintaining his/her posture, the screen device may be determined to be in the user's view.

In an embodiment, the electronic device may obtain gaze information of the user through an eye-tracking sensor or a camera. The device acquiring the user gaze information may indicate that not only is the electronic device which converses with the user is in the user's gaze but also other electronic devices may be in the user's gaze. If other electronic devices is configured to acquire the user gaze information, the electronic device may obtain the user gaze information from the other electronic devices through wireless communication established with the other electronic devices.

In an embodiment, based on determining that the screen device is in the user's view, the electronic device may interact with the user in the co-play type. The electronic device may provide the result through the screen device and provide a voice output requiring the user's response to the result displayed on the screen device. Based on determining that the screen device is out of the user's view, the electronic device may interact the user in the eyes free type or the serial-play type.

In operation 1430, the electronic device may determine the interaction type, based on whether the user's activity requires the user's view. The user's activity requiring the user's view indicates that the user performs the corresponding activity while preventing his/her eyes from moving to somewhere else. For example, if the user is cooking using a sharp knife, the user's eyes need to stay on the knife for the sake of safety and the electronic device may determine the cooking as the user's activity requiring the user's view. In an embodiment, if determining the user's activity requiring the user's view, the interaction between the electronic device and the user may be performed using only voice (i.e., the eyes free type). If determining the user's activity not requiring the user's view, the electronic device may converse with the user using voice and provide the final result through the screen device (i.e., the serial-play type).

The electronic device provides the result using, but not limited to, one of the three types in FIG. 14, but the electronic device may converse with the user about one task and provide various types in another embodiment. For example, the electronic device may converse with the user in the co-play manner and then in the serial-play manner.

Figure 16A:
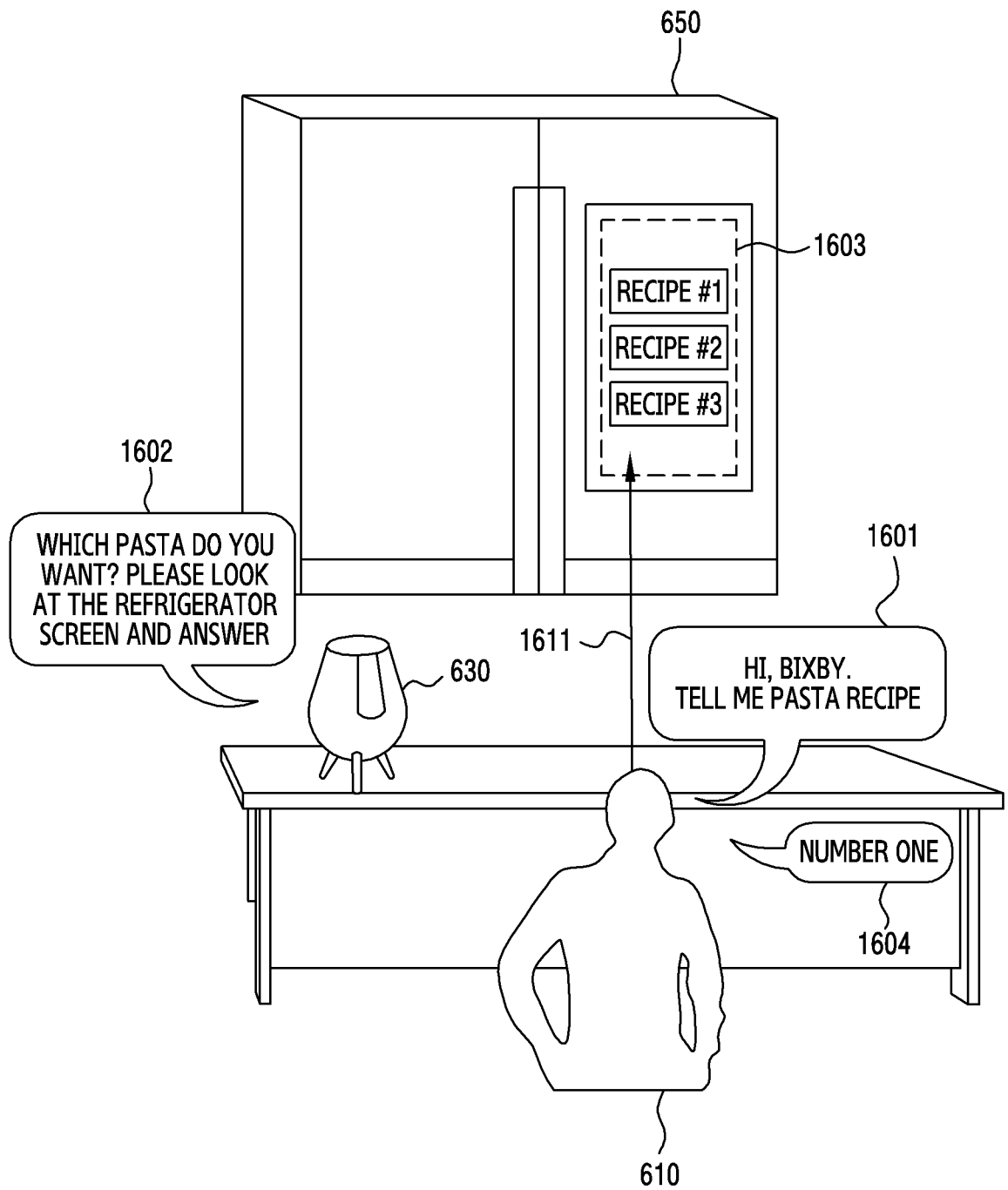
FIG. 16A illustrates an example of a co-play type interaction according to an embodiment.
Figure 16B:
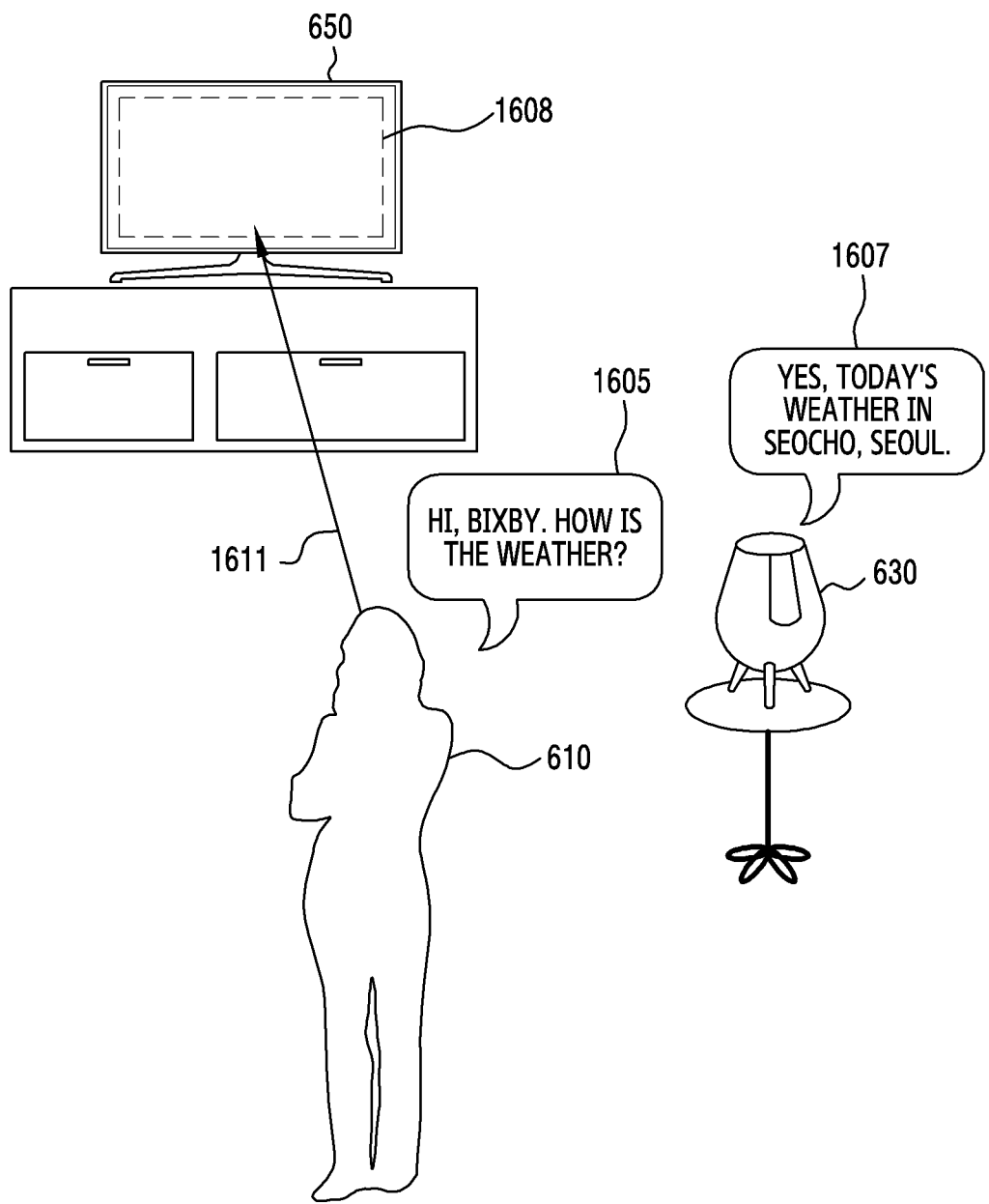
FIG. 16B illustrates an example of the co-play type interaction according to another embodiment.

FIG. 16A and FIG. 16B illustrate examples of a co-play type interaction according to an embodiment.

Referring to FIG. 16A, in response to a voice command 1601 ("Hi Bixby. Tell me the pasta recipe") of the user 610 asking about the pasta recipe, the electronic device 630 may provide a voice output 1602 asking about a pasta type. Since a gaze 1611 of the user 610 is directed to the screen of the refrigerator (or the screen device 650), the electronic device 630 may determine that the screen device 650 is in the gaze of the user 610. The electronic device 630 may visually provide an image 1603 including pasta type information through the screen device 650. The electronic device 630 may provide the pasta type information through the screen device 650 and provide the user with only the voice output 1602 asking about which pasta type the user wants, without having to provide the pasta type information using voice output. If the user 610 selects one 1604 of several pasta types displayed on the screen device 650, the electronic device 630 may provide the recipe of the pasta selected by the user.

Referring to FIG. 16B, in response to a voice command ("Hi Bixby. How is the weather?") asking about the weather, the electronic device 630 may provide weather information through the television (or the screen device 650). Since the gaze 1611 of the user 610 is directed to the screen device 650, the electronic device 630 may visually provide specific weather information 1608 through the screen device 650, without having to provide the specific weather information (e.g., temperature, pressure, cloud cover, etc.) using voice output. The electronic device 630 may provide a voice output 1607 indicating that the information 1608 displayed on the television is the weather information requested by the user 610.

Figure 17:
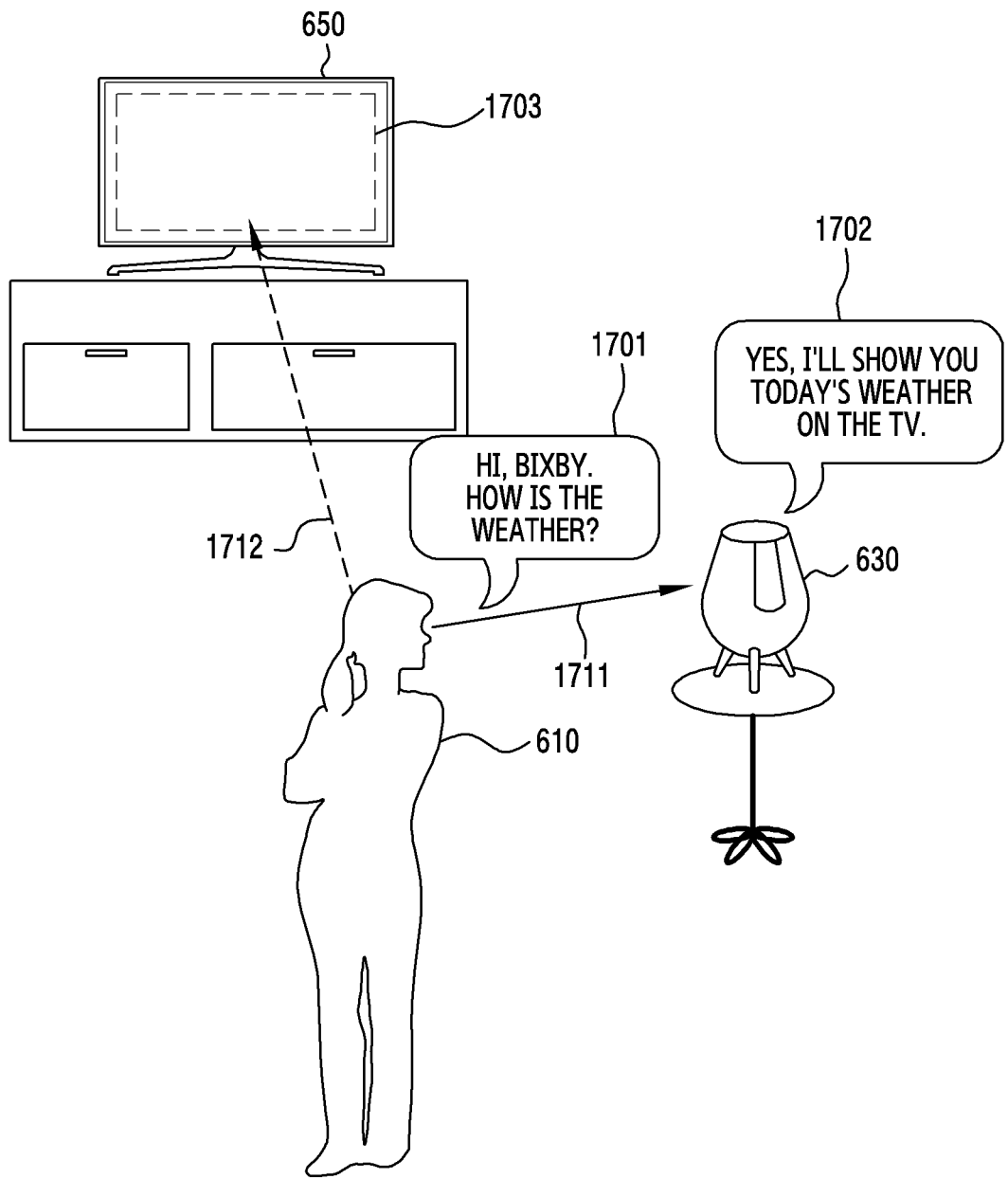
FIG. 17 illustrates an example of a serial-play type interaction according to an embodiment.

FIG. 17 illustrates an example of a serial-play type interaction according to an embodiment.

Referring to FIG. 17, the electronic device 630 may provide weather information 1703 through the screen device 650, in response to a voice command ("Hi Bixby. How is the weather?") asking about the weather. Since a gaze 1711 of the user 610 is not directed to the screen device 650 unlike FIG. 16B, the electronic device 630 may provide a voice output ("I'll show you the weather on the TV") 1702 guiding a gaze 1712 of the user 610 toward the television.

Figure 18:
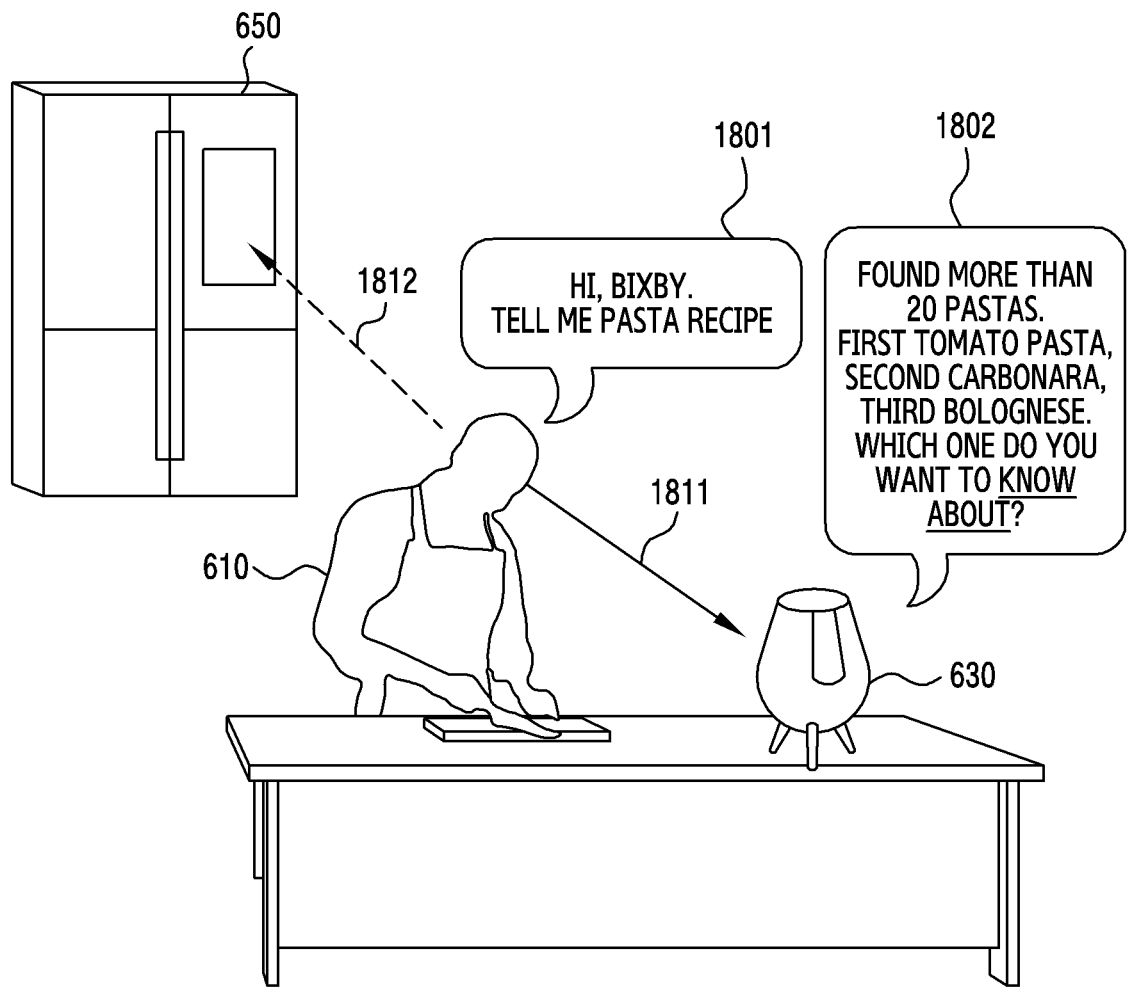
FIG. 18 illustrates an example of an eyes free type interaction according to an embodiment.

FIG. 18 illustrates an example of an eyes free type interaction according to an embodiment.

Referring to FIG. 18, in response to a voice command 1801 ("Hi Bixby. Tell me the pasta recipe") of the user 610 asking about the pasta recipe, the electronic device 630 may provide a voice output 1802 asking about a pasta recipe type. Based on determining that a gaze 1811 of the user 610 is not directed to the screen device 650, the electronic device 630 may determine whether an activity of the user 610 requires the view of the user 610. Since the user is cooking and requires his/her eyes for the sake of safety, the electronic device 630 may interact the user 610 through only voice. That is, the electronic device 630 does not guide a gaze 1812 of the user 610 toward the screen device 650 and does not use the screen device, unlike FIG. 17.

In an embodiment, an electronic device (e.g., the electronic device 630 of FIG. 8A) may include a speaker (e.g., the signal output unit 240 of FIG. 2), a microphone (e.g., the signal receiver unit 210 of FIG. 2), a wireless communication circuit (e.g., the communication module 190 of FIG. 1), at least one processor (e.g., the control unit 220 of FIG. 2) connected to the speaker, the microphone, and the wireless communication circuit, wherein the at least one processor may be configured to, in response to a user's voice command received through the microphone, perform a task corresponding to the voice command, based on an information amount contained in a result of the task, determine a type of the result to be visually appropriate or auditorily appropriate, and based on the type of the result, determine a device for providing the result as a screen device or a speaker.

In an embodiment, the at least one processor of the electronic device may be configured further to determine the result to be visually appropriate, based on a number of items in the result being greater than a designated number, and provide the result through the screen device.

In an embodiment, the at least one processor of the electronic device may be configured further to display the items in the result as a list on the screen device.

In an embodiment, the at least one processor of the electronic device may be configured further to generate a voice script to be outputted to the speaker based on the result, determine the result to be visually appropriate based on a length of the voice script exceeding a designated length, and provide the result through the screen device.

In an embodiment, the length of the voice script may correspond to at least one of a number of characters in the voice script or an expected play time of the voice script.

In an embodiment, the at least one processor of the electronic device may be configured further to determine a number of dialogs required for the task based on a task type corresponding to the voice command, determine the result to be visually appropriate based on the number of the dialogs exceeding a designated number, and provide the result through the screen device.

In an embodiment, the at least one processor of the electronic device may be configured further to determine whether the result contains private information, based on determining that the screen device is a public device, and based on determining that the result contains the private information, provide the result through another screen device (e.g., the personal mobile device 1220 of FIG. 12B) different from the screen device.

In an embodiment, the at least one processor of the electronic device may be configured further to, based on determining the private information is absent from the result, determine whether the screen device is used by a person other than the user, and based on determining that the screen device is used by the person other than the user, provide the result through the other screen device different from the screen device.

In an embodiment, the at least one processor of the electronic device may be configured further to, based on determining that the private information is absent from the result, determine whether the screen device is used by a person other than the user, and based on determining that the screen device is used by the person other than the user, provide a notification related to the result through the screen device.

In an embodiment, the at least one processor of the electronic device may be configured further to, based on determining that the screen device is in a user's view, provide the result through the screen device, and while the screen device displays the result, provide a voice output through the speaker requesting a user's response based on the displayed result.

In an embodiment, the at least one processor of the electronic device may be configured further to, based on determining that the screen device is out of the user's view, provide a voice output for guiding user's eyes to the screen device.

In an embodiment, a storage medium is a non-transitory computer readable storage medium for storing one or more programs, wherein the one or more programs may include instructions, when executed by one or more processors of an electronic device, causing the electronic device to receive a user's voice command through a microphone of the electronic device, in response to the user's voice command, perform a task corresponding to the command, based on an information amount contained in a result of the task, determine a type of the result to be visually appropriate or auditorily appropriate, and based on the type of the result, determine a device for providing the result as a screen device or a speaker.

In an embodiment, the one or more programs stored in the storage medium may further include instructions, when executed by the one or more processors of the electronic device, causing the electronic device to determine the result to be visually appropriate based on a number of items in the result being greater than a designated number, and provide the result through the screen device.

In an embodiment, the one or more programs stored in the storage medium may further include instructions, when executed by the one or more processors of the electronic device, causing the electronic device to generate a voice script to be outputted to the speaker based on the result, determine the result to be visually appropriate based on a length of the voice script exceeding a designated length, and provide the result through the screen device.

In an embodiment, the one or more programs stored in the storage medium may further include instructions, when executed by the one or more processors of the electronic device, causing the electronic device to determine whether the result contains private information, based on determining that the screen device is a public device, and based on determining that the result contains the private information, provide the result through another screen device different from the screen device.

In an embodiment, a control method of an electronic device may include, in response to a user's voice command received through a microphone of the electronic device, performing a task corresponding to the voice command, based on an information amount contained in a result of the task, determining a type of the result to be visually appropriate or auditorily appropriate, and based on the type of the result, determining a device for providing the result as a screen device or a speaker.

In an embodiment, the control method of the electronic device may further include determining the result to be visually appropriate based on a number of items in the result being greater than a designated number, and providing the result through the screen device.

In an embodiment, the control method of the electronic device may further include generating a voice script to be outputted to the speaker based on the result, determining the result to be visually appropriate based on a length of the voice script exceeding a designated length, and providing the result through the screen device.

In an embodiment, the length of the voice script of the control method of the electronic device may correspond to at least one of a number of characters in the voice script or an expected play time of the voice script.

In an embodiment, the control method of the electronic device may further include determining whether the result contains private information, based on determining that the screen device is a public device, and based on determining that the result contains the private information, providing the result through another screen device different from the screen device.

An electronic device according to an embodiment of the disclosure may provide results to a user in the most efficient manner, in response to the user's voice commands.

If the result to be provided to the user contains private information, an electronic device according to an embodiment of the disclosure may provide the result through a personal device, rather than a public screen device, and thus prevent the user's private information from being exposed to others.

An electronic device according to an embodiment of the disclosure may provide the most appropriate interaction type based on the current state of the user, and thus improve usability of devices such as smart speakers.

While the specific embodiments have been described in the explanations of the disclosure, it will be noted that various changes may be made therein without departing from the scope of the disclosure. Thus, the scope of the disclosure is not limited and defined by the described embodiment and is defined not only the scope of the claims as below but also their equivalents.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device comprising:
a speaker;
a microphone;
a wireless communication circuit; and
at least one processor connected to the speaker, the microphone, and the wireless communication circuit,
wherein the at least one processor is configured to:
in response to a user's voice command received through the microphone, perform a task corresponding to the voice command,
execute a first determination of a format for outputting a result of the task, including:
when a first word indicating display of images, videos, maps, or games is included in the voice command, select a visual output as the format for outputting the result, and when a second word indicating playback of music, radio, or podcast is present included in the voice command, select an auditory output as the format for outputting the result, when the first determination fails due to the voice command being nonindicative of the format, execute a second determination of the format for outputting the result of the task, including: detecting whether a count of information included in the result exceeds a predetermined threshold count and select a device capable of outputting the result in the determined format.

2. The electronic device of claim 1, wherein the second determination further includes:

selecting the visual format upon detecting that the count of information in the result is greater than the predetermined threshold count; and displaying the result through a display based on selecting the visual format.

3. The electronic device of claim 2, wherein the at least one processor is further configured further to:

display the information in the result as a list on a screen device.

4. The electronic device of claim 1, wherein the at least one processor is further configured further to:

generate a voice script to be outputted to the speaker based on the result;

determine the result to be visually appropriate based on a length of the voice script exceeding a designated length; and provide the result through a screen device.

5. The electronic device of claim 4, wherein the length of the voice script corresponds to a number of characters in the voice script and/or an expected play time of the voice script.

6. The electronic device of claim 1, wherein the at least one processor is further configured further to:

determine a number of dialogs required for the task based on a task type corresponding to the voice command;

determine the result to be visually appropriate based on the number of the dialogs exceeding a designated number; and provide the result through a screen device.

7. The electronic device of claim 1, wherein the at least one processor is further configured further to:

determine whether the result contains private information, based on determining that a screen device is a public device; and based on determining that the result contains the private information, provide the result through another screen device different from the screen device.

8. The electronic device of claim 7, wherein the at least one processor is further configured further to:

based on determining the private information is absent from the result, determine whether the screen device is used by a person other than the user, and based on determining that the screen device is used by the person other than the user, provide the result through the other screen device different from the screen device.

9. The electronic device of claim 7, wherein the at least one processor is further configured further to:

based on determining that the private information is absent from the result, determine whether the screen device is used by a person other than the user; and based on determining that the screen device is used by the person other than the user, provide a notification related to the result through the screen device.

10. The electronic device of claim 1, wherein the at least one processor is further configured further to:

based on determining that a screen device is in a user's view, provide the result through the screen device; and while the screen device displays the result, provide a voice output through the speaker requesting a user's response based on the displayed result.

11. The electronic device of claim 10, wherein the at least one processor is further configured further to:

based on determining that the screen device is out of the user's view, provide a voice output for guiding user's eyes to the screen device.

12. A non-transitory computer readable storage medium for storing one or more programs, wherein the one or more programs comprise instructions, when executed by one or more processors of an electronic device, causing the electronic device to:

receive a user's voice command through a microphone of the electronic device;

in response to the user's voice command, perform a task corresponding to the voice command;

execute a first determination of a format for outputting result of the task, including:

when a first word indicating display of images, videos, maps, or games is included in the voice command, select a visual output as the format for outputting the result;

when a second word indicating playback of music, radio, or podcast is included in the voice command, select an auditory output as the format for outputting the result;

when the first determination fails due to the voice command being nonindicative of the format, execute a second determination of the format for outputting the result of the task, including: detecting whether a count of information included in the result exceeds a predetermined threshold count; and select a device capable of outputting the result in the determined format.

13. The non-transitory computer readable storage medium of claim 12, wherein the second determination further includes:

selecting the visual format upon detecting that the count of information in the result is greater than the predetermined threshold count; and displaying the result through a display based on selecting the visual format.

14. The non-transitory computer readable storage medium of claim 12, wherein the one or more programs further comprise instructions, when executed by the one or more processors of the electronic device, causing the electronic device to:

generate a voice script to be outputted to a speaker based on the result, determine the result to be visually appropriate based on a length of the voice script exceeding a designated length, and provide the result through a screen device.

15. The non-transitory computer readable storage medium of claim 12, wherein the one or more programs further comprise instructions, when executed by the one or more processors of the electronic device, causing the electronic device to:

determine whether the result contains private information, based on determining that a screen device is a public device, and based on determining that the result contains the private information, provide the result through another screen device different from the screen device.

16. A control method of an electronic device, comprising:
in response to a user's voice command received through a microphone of the electronic device, performing, via at least one processor, a task corresponding to the voice command; executing a first determination of a format for outputting results of the task, including:
when a first word indicating display of images, videos, maps, or games is included in the voice command, selecting a visual output as the format for outputting the results, and
when a second word indicating playback of music, radio, or podcast is present in the voice command, selecting an auditory output as the format for outputting the results;
when the first determination fails due to the voice command being nonindicative of the format, execute a second determination of the format for outputting the results of the task, including: detecting whether a count of information included in the results exceeds a predetermined threshold count; and
selecting a device capable of outputting the results in the determined format.

17. The control method of claim 16, wherein the second determination further includes:
selecting the visual format upon detecting that the count of information in the results is greater than the predetermined threshold count and
displaying the results through a display.

18. The control method of claim 16, further comprising:
generating a voice script to be outputted to a speaker based on the result;
determining the result to be visually appropriate based on a length of the voice script exceeding a designated length; and
providing the result through a screen device.

19. The control method of claim 18, wherein the length of the voice script corresponds to a number of characters in the voice script and/or an expected play time of the voice script.

20. The control method of claim 16, further comprising:
determining whether the result contains private information, based on determining that a screen device is a public device; and
based on determining that the result contains the private information, providing the result through another screen device different from the screen device.

* * * * *